US012608342B1

(12) United States Patent
Wichern et al.

(10) Patent No.: US 12,608,342 B1
(45) Date of Patent: Apr. 21, 2026

(54) DATA AGGREGATION PLATFORM FOR INGESTING, PARTITIONING, AND RETRIEVING ELECTRONIC INFORMATION

(71) Applicant: DMHJV001 Inc., Salt Lake City, UT (US)

(72) Inventors: Donald M. Wichern, South Ogden, UT (US); Joshua D. Talbert, Cottonwood Heights, UT (US)

(73) Assignee: DMHJV001 Inc., Salt Lake City, UT (US)

( * ) Notice: Subject to any disclaimer, the term of this patent is extended or adjusted under 35 U.S.C. 154(b) by 9 days.

(21) Appl. No.: 18/761,247

(22) Filed: Jul. 1, 2024

Related U.S. Application Data

(60) Provisional application No. 63/511,137, filed on Jun. 29, 2023.

(51) Int. Cl.
| | |
|---|---|
| *G06F 16/16* | (2019.01) |
| *G06F 16/18* | (2019.01) |
| *G06F 16/334* | (2025.01) |
| *G06Q 40/03* | (2023.01) |

(52) U.S. Cl.
CPC ............ *G06F 16/164* (2019.01); *G06F 16/18* (2019.01); *G06F 16/3344* (2019.01); *G06Q 40/03* (2023.01)

(58) Field of Classification Search
CPC .... G06F 16/164; G06F 16/18; G06F 16/3344; G06Q 40/03; H04L 51/07; G06N 3/0455

USPC .......................................................... 707/822
See application file for complete search history.

(56) References Cited

U.S. PATENT DOCUMENTS

| | | | | |
|---|---|---|---|---|
| 11,962,551 | B1 * | 4/2024 | Herrmann ............... | H04L 51/07 |
| 2018/0084310 | A1 * | 3/2018 | Katz ...................... | G06V 20/42 |
| 2018/0293552 | A1 * | 10/2018 | Zhang .................... | G06V 10/25 |
| 2019/0005670 | A1 * | 1/2019 | DeTone ............. | G06F 18/2413 |
| 2019/0102676 | A1 * | 4/2019 | Nazari ............. | G06F 16/24568 |
| 2022/0207606 | A1 * | 6/2022 | Dickie .................. | G06N 20/20 |
| 2024/0046074 | A1 * | 2/2024 | Lewis ................... | G10L 15/18 |

* cited by examiner

*Primary Examiner* — Shahid A Alam
(74) *Attorney, Agent, or Firm* — TechLaw Ventures, PLLC; Terrence J. Edwards

(57) ABSTRACT

Systems, computer-implemented platforms, and methods for ingesting, translating, partitioning, and retrieving data aggregated from disparate sources. A method includes ingesting a file from a data source and identifying an aggregated data package to receive the file based on one or more of an identity of the data source or whether the data source provided the file in response to a digital data request. The method includes storing the file in a data shoebox associated with the aggregated data package, wherein the data shoebox receives unclassified data. The method includes causing a neural network to classify the file based on content of the file and moving the file from the data shoebox to an identified data bucket within the aggregated data package based on a file classification output by the neural network.

20 Claims, 17 Drawing Sheets

Figure 1A:
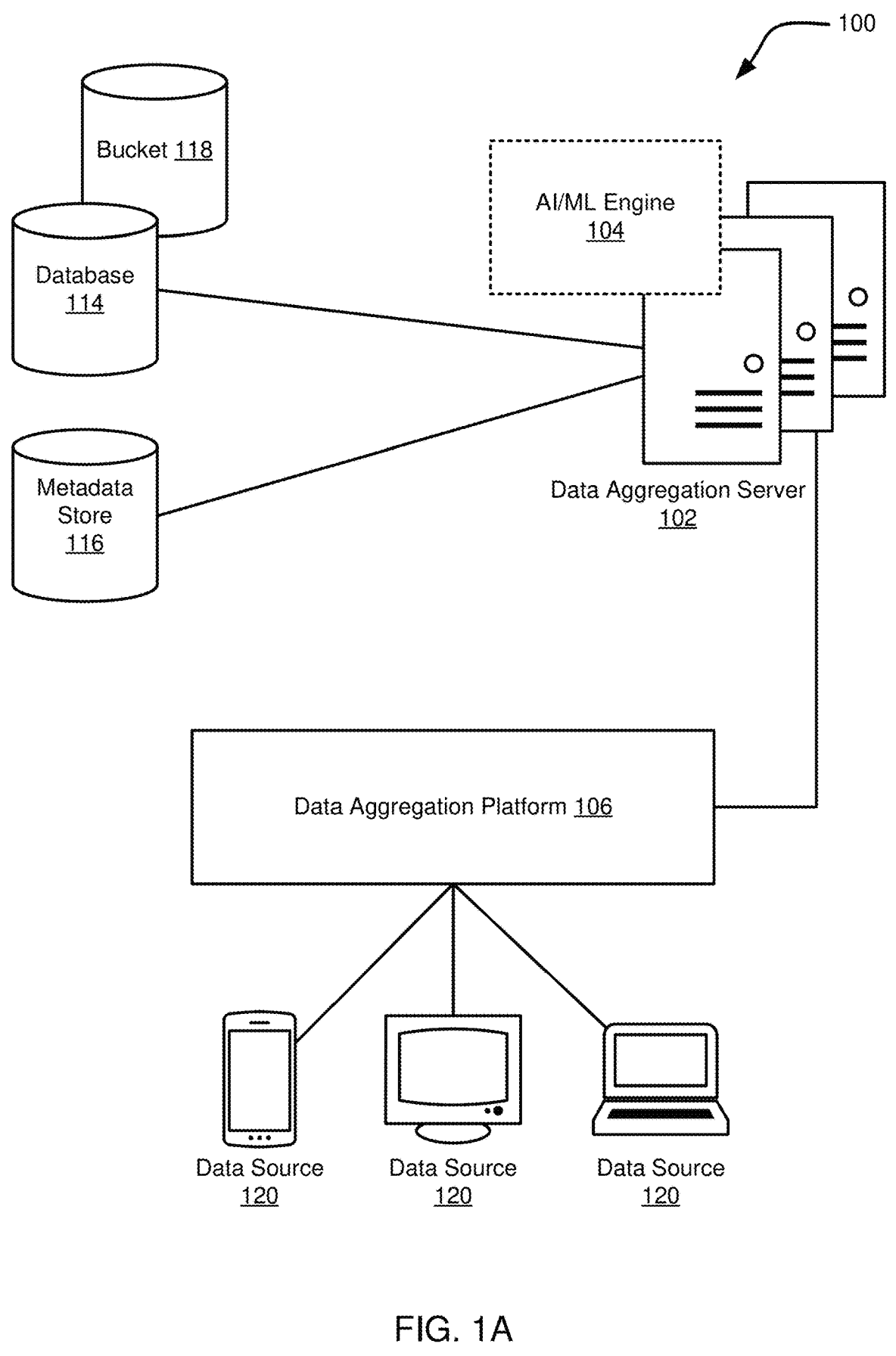

100

Bucket 118

Database
114

Metadata
Store
116

AI/ML Engine
104

Data Aggregation Server
102

Data Aggregation Platform 106

Data Source
120

Data Source
120

Data Source
120

| Internal Data Source 402 | ⟷ | Data Aggregation Server 102 | ⟷ | External Data Source 404 |

500 ⟶

Data Aggregation Server 102 ⟷ Receive Data 502 ⟷ External Data Source 404

Electronic Data Security Measure
504

Securely Communicate With Virtual Data Center
506

De-Encrypt Encrypted Data
508

700

```
┌─────────────────────────────────────────────────────────────────────┐
│                          Data Input                                   │
│                            702                                        │
│                                                                       │
│  ┌──────────────────┐  ┌──────────────────┐  ┌──────────────────┐    │
│  │ Business Credit  │  │ Business         │  │ Business Tax     │    │
│  │ Report           │  │ Financial        │  │ Returns          │    │
│  │                  │  │ Statements       │  │                  │    │
│  └──────────────────┘  └──────────────────┘  └──────────────────┘    │
│                                                                       │
│  ┌──────────────────┐  ┌──────────────────┐  ┌──────────────────┐    │
│  │ Entity Search    │  │ Bank Account     │  │ Individual       │    │
│  │                  │  │ Statements       │  │ Background        │    │
│  │                  │  │                  │  │ Checks           │    │
│  └──────────────────┘  └──────────────────┘  └──────────────────┘    │
│                                                                       │
│  ┌──────────────────┐  ┌──────────────────┐  ┌──────────────────┐    │
│  │ Individual       │  │ Individual Tax   │  │ Lien Search      │    │
│  │ Financial        │  │ Returns          │  │                  │    │
│  │ Statements       │  │                  │  │                  │    │
│  └──────────────────┘  └──────────────────┘  └──────────────────┘    │
│                                                                       │
│  ┌──────────────────┐  ┌──────────────────┐  ┌──────────────────┐    │
│  │ Online Reviews   │  │ Business Plan    │  │ Application      │    │
│  └──────────────────┘  └──────────────────┘  └──────────────────┘    │
│                                                                       │
│  ┌──────────────────┐  ┌──────────────────┐  ┌──────────────────┐    │
│  │ Owners Credit    │  │ Owners/Borrowers │  │ Images Of        │    │
│  │ Reports          │  │ Social Media     │  │ Financed Asset   │    │
│  └──────────────────┘  └──────────────────┘  └──────────────────┘    │
│                                                                       │
│  ┌──────────────────┐  ┌──────────────────┐                          │
│  │ Deal-Specific    │  │ Corporate        │                          │
│  │ Documents        │  │ Documents        │                          │
│  └──────────────────┘  └──────────────────┘                          │
└─────────────────────────────────────────────────────────────────────┘
```

```
┌──────────────────┐        ┌──────────────────┐
│ Dynamic Score    │        │ Data Presentation│
│ 712              │        │ 704              │
└──────────────────┘        └──────────────────┘
```

Dynamic Score
712

Media Organization
Metadata Store For Media
File Folder Structure
Document Organization Dynamic Score Dashboard
804

Credit Analysis
806

Underwriting
808

Committee/Board Approval
810

900

| Training Dataset 902 |
| --- |
| Historical Lending Data |
| Historical Business Data |
| Historical Preference Data |
| Historical Workflow Data |
| Historical Demographic Data |

| Input Dataset 904 |
| --- |
| Applicant Data |
| Obligations And Exposures Data |
| Current Funding Data |
| Loans-To-Date Data |
| Preference Data |

AI/ML Engine
104

Predictive Modeling
308

1000

Data Aggregation Platform 106
(Data Recipient Perspective)

Leads 1002

Origination 1004

Portfolio 1006

Archive 1008

Applicant
1010

Data Aggregator
1014

Decision Maker
604

Third-Party Data
Verifier 1012

1100

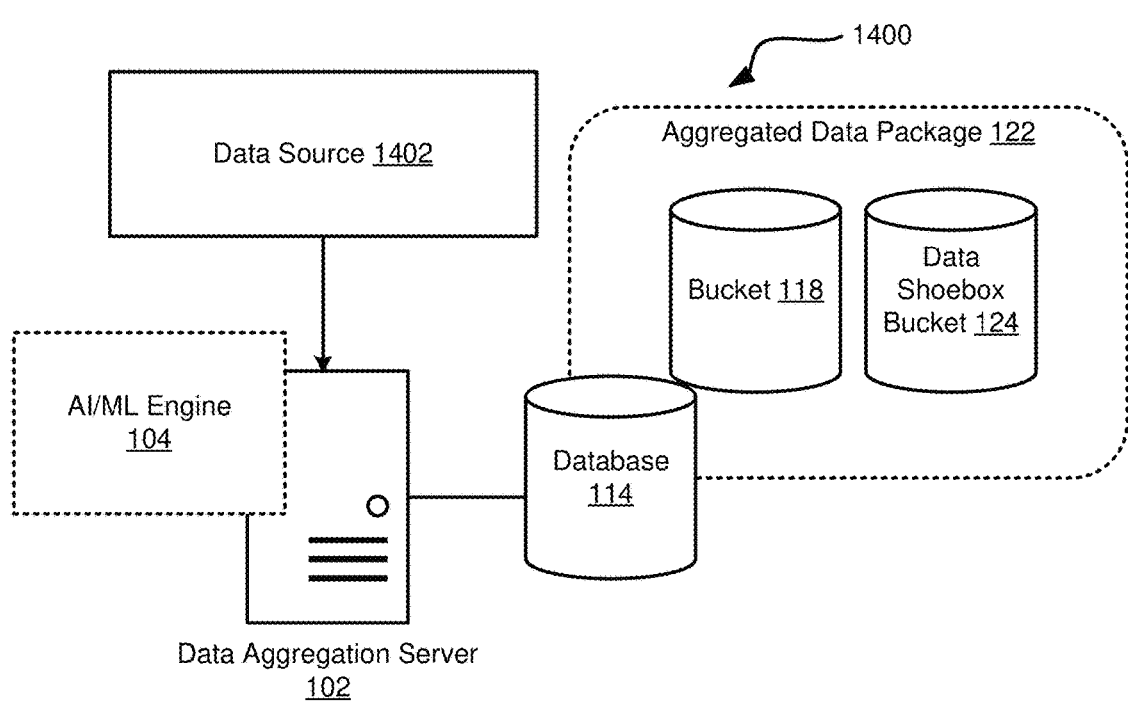
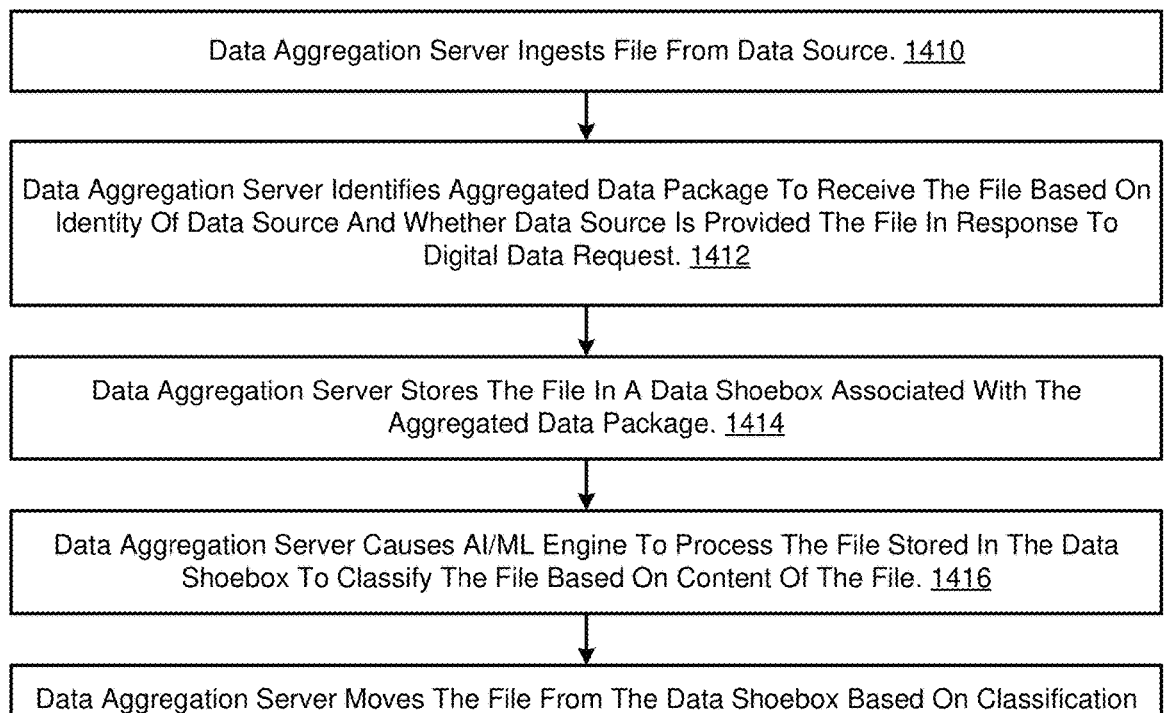
FIG. 14

1500

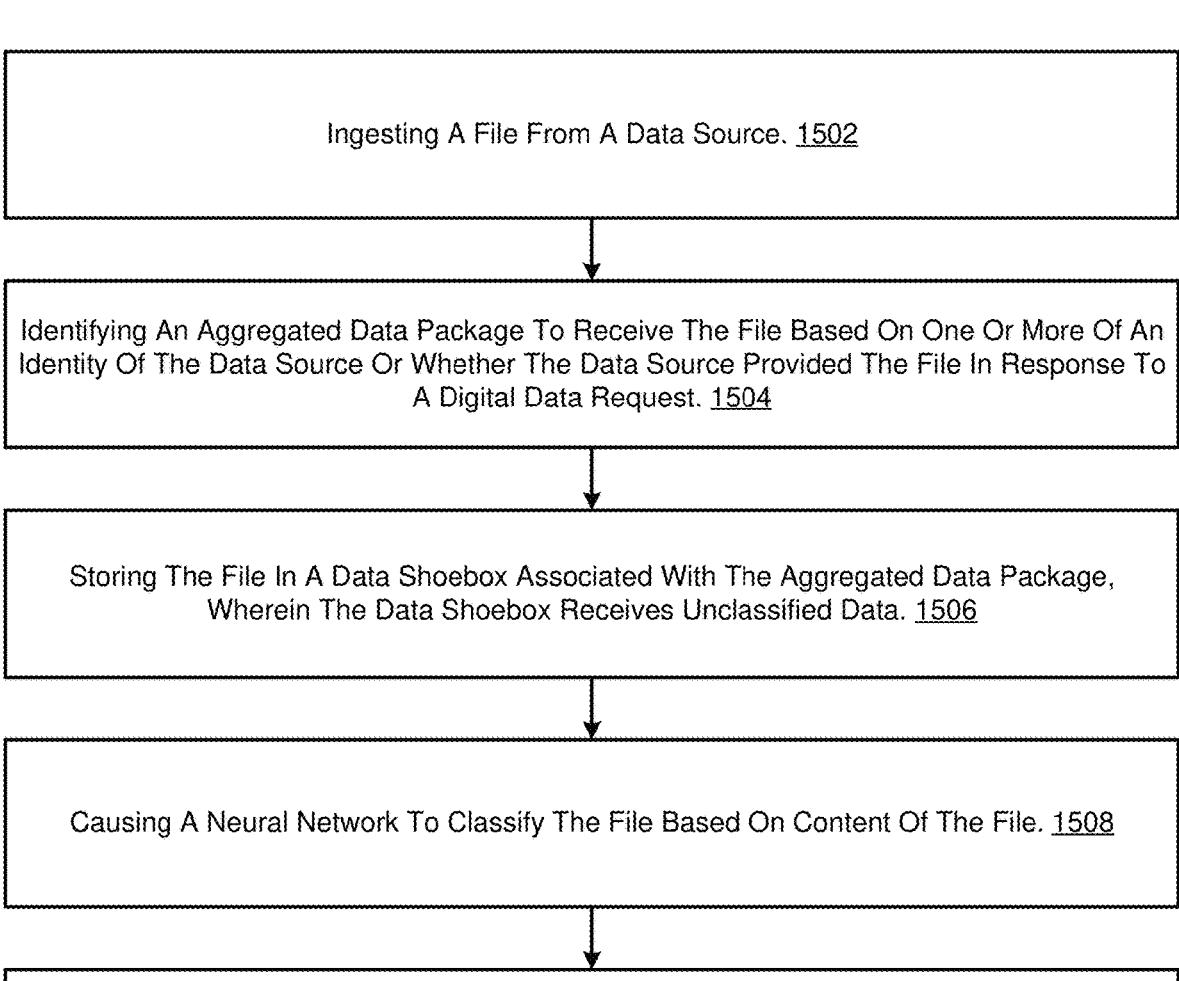

Ingesting A File From A Data Source. 1502

Identifying An Aggregated Data Package To Receive The File Based On One Or More Of An Identity Of The Data Source Or Whether The Data Source Provided The File In Response To A Digital Data Request. 1504

Storing The File In A Data Shoebox Associated With The Aggregated Data Package, Wherein The Data Shoebox Receives Unclassified Data. 1506

Causing A Neural Network To Classify The File Based On Content Of The File. 1508

Moving The File From The Data Shoebox To An Identified Data Bucket Within The Aggregated Data Package Based On A File Classification Output By The Neural Network. 1510

FIG. 15

DATA AGGREGATION PLATFORM FOR INGESTING, PARTITIONING, AND RETRIEVING ELECTRONIC INFORMATION

CROSS-REFERENCE TO RELATED APPLICATION

This application claims the benefit of U.S. Provisional Patent Application No. 63/511,137, filed Jun. 29, 2023, titled "DATA AGGREGATION PLATFORM FOR INGESTING, PARTITIONING, AND RETRIEVING ELECTRONIC INFORMATION," which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The disclosure relates generally to computer-implemented platforms for ingesting, aggregating, partitioning, and retrieving electronic information.

BACKGROUND

Numerous industries would benefit from automated data aggregation and analysis. However, when data is ingested from disparate sources, the data is often organized and described using different protocols. For example, in the commercial lending industry, a commercial loan application typically includes documents relating to the credit history, obligations and exposures, and assets of numerous individuals and businesses. These documents are typically prepared by different entities and use different conventions for classifying information. These different conventions for classifying information and presenting information present a technical problem that cannot be solved using routine methods for storing and compiling data.

What is needed are improved means for ingesting, normalizing, partitioning, and assessing data retrieved from disparate sources such that the data can be analyzed in real-time. Considering the foregoing, disclosed herein are systems, methods, and devices for data ingestion, translation, and analysis.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood regarding the following description and accompanying drawings where:

FIG. 1A is a schematic diagram of a system for data ingestion, normalization, aggregation, and analysis;

FIG. 7 is a schematic block diagram of a data flow for preparing a dynamic score and data presentation based on data aggregated from a plurality of disparate data sources;

FIG. 14 is a schematic block diagram of a system and process flow for data organization across a plurality of data buckets associated with an aggregated data package;

FIG. 15 is a schematic block diagram of a method for data organization across a plurality of data buckets associated with an aggregated data package.

DETAILED DESCRIPTION

Figure 1B:
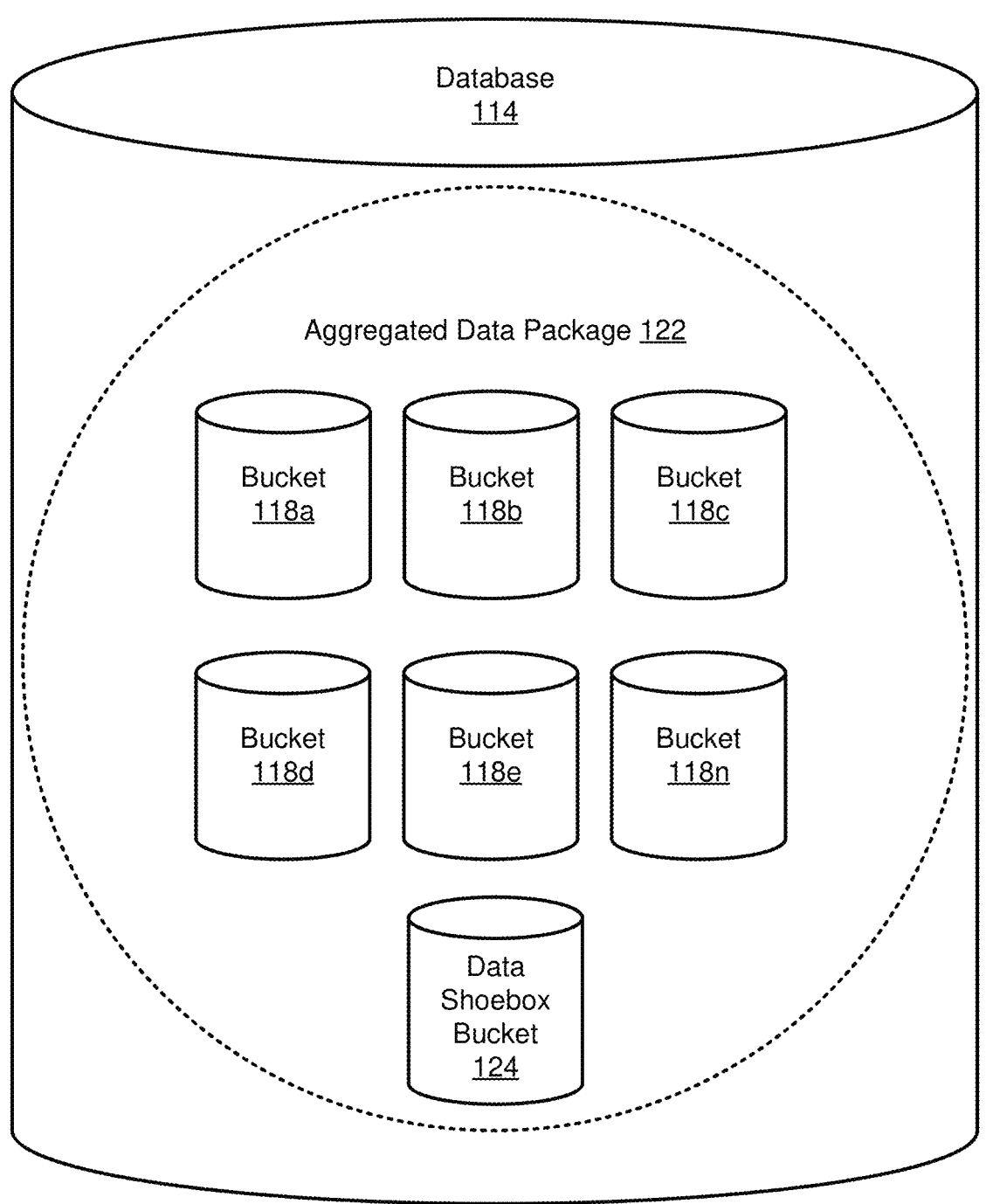
FIG. 1B is a schematic diagram of a data partitioning and organization schema for a cloud-based database.

Disclosed herein are systems, methods, and devices for data ingestion, normalization, partitioning, and analysis. The systems, methods, and devices described herein can be implemented in various contexts, including, for example, commercial lending applications, private lending applications, requests for proposals, accounting applications, healthcare applications, legal applications, school applications, and other implementations wherein data is retrieved from disparate sources and aggregated in a single aggregated data package for further analysis. Further disclosed herein are systems, methods, and devices for identifying characters within an unstructured file and performing predictive modeling to improve data aggregation systems based on historical outcomes.

The commercial lending process presents challenges for applicants because applicants may not understand the process and document requirements, applicants may struggle to ensure that partners on the loan are providing necessary documents, applicants are unsure where they are in the lending process, and applicants are unsure when they may close on the loan and funds will be delivered. The commercial lending process is challenging for the lending officers because they spend a significant percentage of their time collecting documents from applicants and communicating with applicants, which reduces lending officers' productivity in executing their primary function of developing new relationships with businesses seeking loans. They must also communicate with clients through multiple communication threads such as email, SMS, MMS, telephonic, and fax. The commercial lending process is challenging for bank management because they seek greater visibility into the data package pipeline, they struggle to manage the lending workload, they do not have a reliable funding forecast, and they struggle to maximize business development. The systems, methods, and devices described herein resolve these pain points by presenting a comprehensive and secure system to shorten the data aggregation process, increase communication between applicants and lenders, and increase the security of document exchange.

The systems, methods, and devices described herein enable strong customer relationships between lenders and applicants, provide a unified communications platform, provide a clear understanding to an applicant of the application process, decision requirements, and generate an authenticated and auditable digital footprint for data package documents and the individuals involved in the process.

Before the structures, systems, and methods for data ingestion, translation, and analysis are disclosed and described, it is to be understood that this disclosure is not limited to the structures, configurations, process steps, and materials disclosed herein as such structures, configurations, process steps, and materials may vary somewhat. It is also to be understood that the terminology employed herein is used for the purpose of describing embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1A is a schematic diagram of a system 100 for data aggregation and reconciliation that can be implemented for increasing the efficiency of computing systems for ingesting, storing, and analyzing data. The system 100 includes a resource management server 102 that may include or utilize an artificial intelligence and/or machine learning (AI/ML) engine 104. The resource management server 102 processes operations for a resource management platform 106 that is made accessible to users by way of applications running on data sources 120. The resource management platform 106 includes numerous modules and may at least include modules for the functionalities described in connection with FIG. 3, including, for example, account establishment, account linking, third-party integrations, predictive modeling, discrepancy resolution, dynamic profile analysis, data partitioning and security, file analysis, data translation, data packaging, data bucket integration, and web scraping. The system 100 includes a database 114 for storing ingested and partitioned data, training datasets, structured data, unstructured data, and so forth.

The data aggregation server 102 manages and updates aggregated data packages that are stored in one or more buckets 118 of the database 114. The aggregated data packages discussed herein may specifically be implemented to store data associated with an application, such as a commercial lending application, mortgage lending application, application submitted in response to a request for proposals, education admissions application, job application, tax return organizers and so forth. The data aggregation server 102 communicates with other entities and databases by way of Application Program Interfaces (APIs), Secure File Transfer Protocols (SFTP), or other connections by way of a network.

The data aggregation server 102 provides storage and processing resources to support the data aggregation platform 106. The data aggregation platform 106 is a system for executing image analysis algorithms on unstructured files, executing predictive modeling algorithms, storing, and managing aggregated data packages, and storing and managing virtual files that represent that data stored within an aggregated data package.

The resource management server 102 renders a graphical user interface (GUI) for the resource management platform 106. The user utilizes the GUI of the resource management platform 106 to create an account, provide project data, provide asset and personnel data, provide project updates, communicate with other accounts, and so forth. The GUI of the resource management platform 106 is accessible by way of an application, web browser, or other interface.

An aggregated data package is a specialized data format comprising a plurality of data buckets 118. Each data bucket 118 within the aggregated data package is associated with a certain datatype or data content. The aggregated data package stores structured information and unstructured information. In an example implementation, an aggregated data package is a manipulatable data form comprising commercial lending data. In this implementation, the aggregated data package may comprise text-based data buckets for "applicant name," "applicant date of birth," "company name," "requested loan amount," and so forth. Additionally, the aggregated data package includes additional data buckets for receiving unstructured files, such as images, videos, audio files, emails, chat communications, and so forth. These unstructured files are stored with a specific metadata tag in association with the aggregated data package.

The database 114 is a repository of information, datasets, images, structured data, unstructured data, and training datasets for the AI/ML engine 104. The resource management server 102 may access the database 114 by way of an Application Program Interface (API) over the network connection. The API allows the resource management server 102 to receive automatic updates from the database 114 as needed. In an embodiment, the database 114 is integrated on the resource management server 102 and is not independent of the storage and processing resources dedicated to the resource management server 102.

Data stored in the remote or cloud storage, such as the database 114, may include data, including images and related data, from many different entities, customers, locations, or the like. The stored data may be accessible to a classification system that includes a classification model, neural network, or other machine learning algorithm.

Each independent database instance within the database 114 is partitioned into a plurality of tables. In an example implementation, the resource management platform 106 is used for managing various construction projects implemented by different clients. Each client account may have separate tables for each construction projected that is being planned or executed by that client. The different client accounts are assigned independent database instances, so there is no threat of crosstalk or sharing of project information between different client accounts. One construction project may include a plurality of jobs, and each of the plurality of jobs may include a plurality of tasks that must be completed. In various implementations, the database 114 may include separate tables for each project, each job, and/or each task. The database 114 may include separate tables for storing a listing of employees or contractors, a listing of tasks to be executed, a listing of tools, a listing of equipment, a listing of construction schedules, a listing of work history data, and so forth.

The database 114 may include a plurality of database instances, wherein each database instance may be assigned to a different client account. In an implementation, the resource management platform 106 is implemented for ingesting, translating, and aggregating data for aggregated data packages, and in this case, the database 114 may include an independent database instance for each entity using the resource management platform 106. In an alternative embodiment, the data for each entity is stored in the same physical memory location, and permissions for reading or writing the data is controlled by way of permissions managed by the resource management platform 106.

The database 114 is partitioned into a plurality of aggregated data packages. Each aggregated data package includes a plurality of file buckets and a plurality of datapoint buckets. The file buckets comprise an indication of a certain type of file that must be ingested before the aggregated data package can be deemed complete. The datapoint buckets comprise an indication of a certain type of information that must be ingested before the aggregated data package can be deemed complete.

The database 114 includes and/or communicates with a metadata store 116 and a bucket 118. In various implementations, the metadata store 116 and the bucket 118 may be considered a component of the database 114, and in other implementations, they may be separate database structures that operate independently of the database 114. The metadata store 116 includes a listing of where information is stored on the database 114. The metadata store 116 may specifically include tables storing metadata about non-structured files stored in the bucket 118, and the metadata store 116 may additionally include an indication of where those non-structured files can be located within the bucket 118. The bucket stores non-structured files such as videos, images, documents, PDFs, and other files.

The metadata store 116 comprises a table for media. The media table includes metadata information about all media stored in the bucket 118. The metadata information includes, for example, geographical coordinate information, name, purpose, classification (e.g., what the media is depicting or why the media was captured), and timestamp. The media table further includes an indication of where the media can be retrieved from the bucket 118. The media table on the metadata store 116 points to where the media itself is stored on the bucket 118 and further points to a table that describes the media. The table describing the media may include, for example, an independent table on the database 114 describing what is depicted in the media. For example, if the media includes an image of a grouping of tools, then the metadata store 116 may point to a table on the database 114 that identifies all tools that should be included within that specific grouping of tools depicted in the image. The media table on the metadata store 116 is a polymorphic many-to-many table. The media itself (stored on the bucket 118) may be applied to any other model or table.

The database 114 may be structured as a relational database. In a relational database, files and data are stored with predefined relationships to one another. The files and data are organized as a set of tables with columns and rows, and tables are used to hold information about the objects to be represented in the database 114.

The database 114 may be structured as a directed graph file system (which may be referred to as a semantic file system). The directed graph file system structures data according to semantics and intent, rather than location. The directed graph file system allows data to be addressed by content (associative access).

The data sources 120 may include, for example, mobile phones, laptops, personal computers, servers, server groups, tablets, image sensors, cameras, scanners, desktop computers, set-top boxes, gaming consoles, smart televisions, smart watches, fitness bands, optical head-mounted displays, virtual reality headsets, smart glasses, HDMI or other electronic display dongles, personal digital assistants, and/or another computing device comprising a processor (e.g., a central processing unit (CPU)), a processor core, image sensors, cameras, a field programmable gate array (FPGA), or other programmable logic, an application specific integrated circuit (ASIC), a controller, a microcontroller, and/or another semiconductor integrated circuit device, a volatile memory, and/or a non-volatile storage medium. The data sources 120 may comprise processing resources for executing instructions stored in non-transitory computer readable storage media. These instructions may be incorporated in an application stored locally to the data source 120, an application accessible on a web browser, and so forth. The application enables a user to access the user interface for the resource management platform 106 to check submissions, upload files, verify whether files are accurately uploaded, receive feedback from the AI/ML engine 104, and so forth.

In an embodiment, a user accesses an account associated with the resource management platform 106 by way of the data source 120. The user may be assigned a security role and location access to as many, or few, entities as is required by the user's position. Security roles restrict what information and/or functionality the user can access. The resource management platform 106 may be accessible on a mobile phone application. The mobile phone application uses the camera and networking capabilities of the mobile phone to capture images and upload those images to the resource management server 102 and AI/ML engine 104 for analysis.

In an example implementation, the aggregated data package is associated with a single data package for a commercial loan. The plurality of file buckets for this aggregated data package includes, for example, a first file bucket for an applicant tax return, a second file bucket for an applicant driver license or other government identification, a third file bucket for an applicant bank statement, a fourth file bucket for an applicant address verification, and so forth. Further in this example, the plurality of datapoint buckets for this aggregated data package include, for example, a first datapoint bucket for the applicant's name, a second datapoint bucket for the applicant's contact information, a third datapoint bucket for the applicant's credit score, a fourth data-point bucket for the applicant's debt-to-income ratio, and so forth. When each of the file buckets and the datapoint buckets are filled, the aggregated data package may be deemed complete, and thus, the commercial data package may be deemed complete. The datapoint buckets may be filled with information that has been read and retrieved from a file such as an image, scan, document, video, and so forth. The datapoint buckets may further be filled with information retrieved from third-party services that communicate with the data aggregation server 102 by way of a secure Application Programming Interface (API).

The data aggregation platform 106 includes a messaging portal to enable easy communications between the data sources 120. In some implementations, the messages input through the messaging portal of the data aggregation platform 106 are automatically copied and forwarded to another address, such as an email address or a telephone number. When the messages are forward through another communication channel, the messages may include a hyperlink that redirects a user to the user interface of the data aggregation platform 106 such that the user may respond within the messaging portal. The messaging portal is particularly useful for a manager tasked with managing multiple applications with different parties. The messaging portal simplifies the task of communicating with different parties about their respective applications.

FIG. 1B is a schematic block diagram of an example data organization structure for the database 114. The database 114 may be partitioned to include a plurality of independent aggregated data packages 122. Each of the aggregated data packages 122 may be associated with one or more data buckets. The exemplary database 114 illustrated in FIG. 2 includes one aggregated data package 122 that includes numerous buckets 118, including, for example, a first bucket 118a, a second bucket 118b, a third bucket 118c, a fourth bucket 118d, a fifth bucket 118e, and on up through an nth bucket 118n. The aggregated data package 122 additionally includes a data shoebox bucket 124.

The buckets 118 serve as basic containers for holding data within the cloud-accessible database 114. All data stored on the database 114 may be assigned to be stored within a bucket 118. The buckets 118 may be utilized to organize data and control access to data. In some cases, a certain bucket 118 is dedicated to storing only certain types of data, and all data within the bucket 118 may have certain read/write permissions for various users of the data aggregation platform 106. There is no limit to the quantity of buckets 118 that may be organized on the database 114. Each bucket 118 is assigned a globally-unique name and is assigned a certain geographic location where the bucket 118 and its digital contents are stored.

Each bucket 118 may be dedicated to storing only a certain type or content of data. In an example use-case, one bucket 118 is dedicated to storing only tax documents, while another bucket is dedicated to storing only financial statements. In an alternative use-case, one bucket 118 is dedicated to storing all unstructured files associated with the aggregated data package 122, while another bucket 118 is dedicated to storing all structured files associated with the aggregated data package 122. The content, classification, and organizational schema of the buckets 118 may be optimized depending on the use and the desired use-case.

The data shoebox bucket 124 is configured to store "unclassified" data, or data that does not have sufficient metadata to determine the content of the data. Thus, the data shoebox bucket 124 may serve as a "catchall" for temporarily storing files and other information that has not yet been processed by the data aggregation server 102. Information stored on the data shoebox bucket 124 may be moved to a different bucket 118 after the information has been classified by a user or the AI/ML engine 104.

Figure 2:
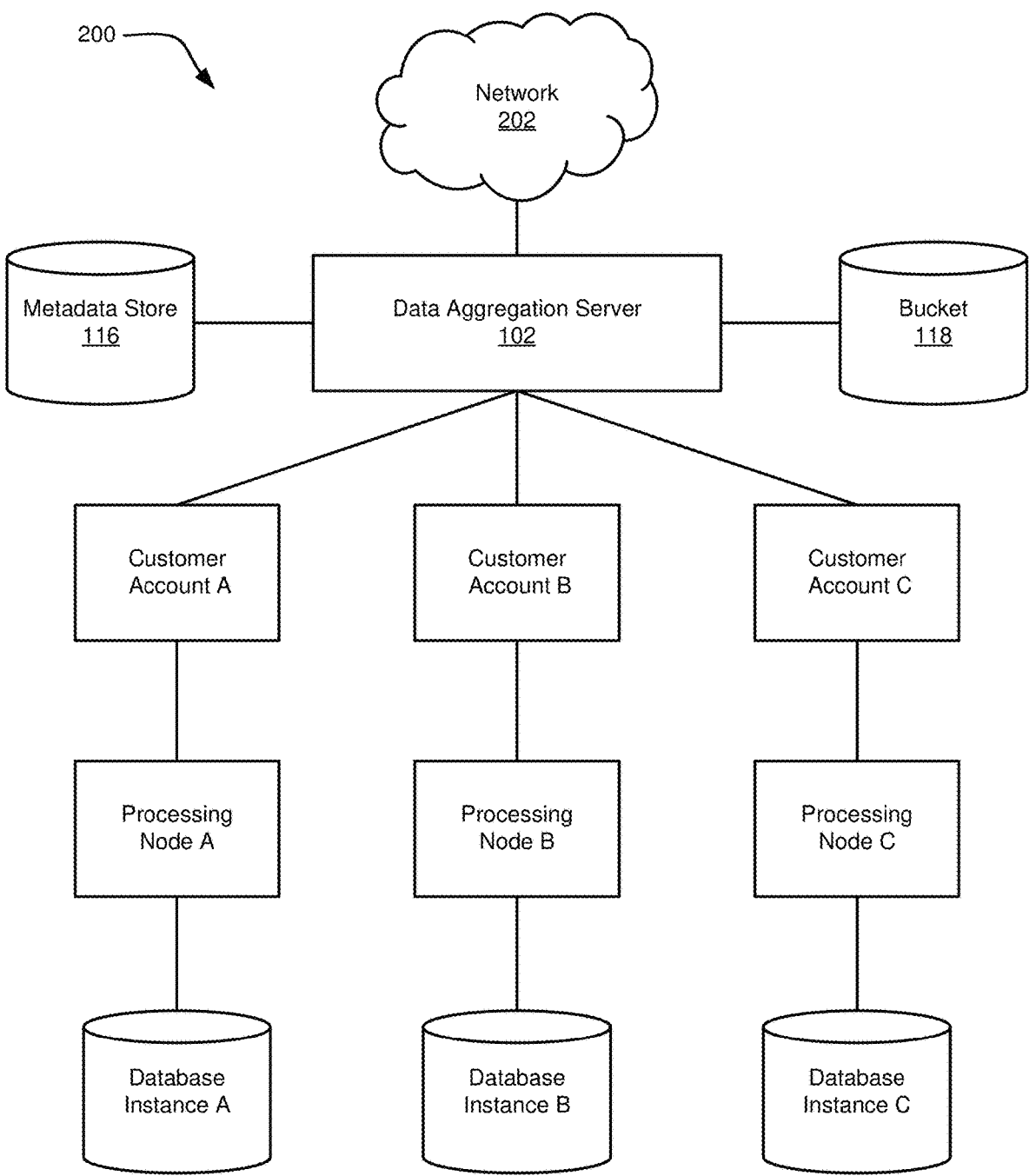
FIG. 2 is a schematic diagram of a system for data management and permissioned access to database entries.

FIG. 2 is a schematic diagram of a system 200 for data management and permissioned access to database entries. The systems described herein may be implemented in environments with highly sensitive data, and therefore, it can be imperative to ensure there is no crosstalk between customer or applicant accounts. The system includes a resource manager executed by the data aggregation server 102.

The data aggregation server 102 oversees data ingestion and data management for a plurality of client accounts, such as Customer Account A, Customer Account B, and Customer Account C. The data aggregation server 102 manages an execution platform that includes a plurality of processing nodes associated with the client accounts. The customer accounts may share the processing resources of the execution platform and/or may be assigned independent processing resources. FIG. 2 illustrates a plurality of processing nodes within the execution platform, including Processing Node A, Processing Node B, and Processing Node C.

The data aggregation server 102 manages the ingestion, normalization, organization, and storage of data entries within the storage resources. The storage resources include data entries pertaining to transactions associated with the client accounts. The customer accounts may have secure, permissioned access to data entries based on permissions metadata stored on the metadata store 116. The storage resources include data entries stored across a plurality of database instances, including, for example, Database Instance A, Database Instance B, and Database Instance C. It should be appreciated that the data aggregation server 102 may be in communication with any number of client accounts, processing nodes, and client database instances.

The storage resources store data in partitions that can be queried by the data aggregation server 102. The data entries in the storage resources are immutable such that the entries cannot be deleted or modified and can only be replaced by storing a new, superseding data entry.

The network 202 includes any type of network, such as a local area network, a wide area network, the Internet, a cellular communication network, or any combination of two or more communication networks. The data aggregation server 102 communicates with some client accounts and outside parties by way of communication protocols such as SWIFT MT (Society for Worldwide Interbank Financial Telecommunication Message Type) messages (such as MT 2XX, 5XX, 9XX), ISO 9022 (a standard for electronic data interchange between financial institutions), and proprietary application interfaces. The data aggregation server 102 ingests data and receives communications from client accounts (and entities associated with the client accounts) using secure APIs (Application Program Interfaces) and other protocols. The data aggregation server 102 can integrate with existing financial institutions, banks, clearinghouses, and exchanges without significant modification to the institution's systems.

The data aggregation server 102 determines whether a user is authorized, and what data that user is authorized to access. The data aggregation server 102 verifies the identity of each machine using security certificates and cryptographic keys. The data aggregation server 102 stores a listing of authorized users and roles, which may include actual users, systems, devices, or applications that are authorized to interact with the data aggregation server 102 and/or access certain data stored on the storage resources. The integrity of the system is provided using secure channels to communicate between the data aggregation server 102 and external systems. In some embodiments, communication between the data aggregation server 102 and external systems is performed using highly secure TLS (Transport Layer Security) with well-established handshakes between the data aggregation server 102 and the external systems. Implementations may use dedicated virtual private clouds (VPCs) for communication between the data aggregation server 102 and any external systems. Dedicated VPCs offer clients the ability to set up their own security and rules for accessing data aggregation server 102. In some situations, an external system or user may use the DirectConnect network service for better service-level agreements and security.

The data aggregation server 102 supports role-based access control of workflows and the actions associated with workflows. In some embodiments, users can customize a workflow to add custom steps to integrate with external systems. Additionally, system developers can develop custom workflows to support new business processes. In particular implementations, some of the actions performed by a workflow can be manual approvals, a SWIFT message request/response, scheduled or time-based actions, and the like. In some embodiments, roles can be assigned to users and access control lists can be applied to roles. An access control list controls access to actions and operations on entities within a network. This approach provides a hierarchical way of assigning privileges to users. A set of roles also include roles related to replication of data, which allows the data aggregation server 102 to identify what data can be replicated and who is the authorized user to be receiving the data at an external system.

The data aggregation platform 106 manages authentication of users. Authentication refers to how a user signs into the data aggregation platform 106 to access data within the database 112. The user must be authenticated as the root user or an Identity and Access Management (IAM) role. Additionally, a user may be assigned a tenant's single sign-on authentication. In these cases, an administrator previously set up identity federation using IAM roles. The data aggregation platform 106 manages root users, IAM users and groups, and service administrators. The data aggregation platform 106 provides cross-service access to some features with principal permissions, service roles, or service-linked roles.

Each of the Customer Accounts may represent a tenant on the cloud-based database and/or an individual user account within a tenant. When a user signs up on the data aggregation platform 106, the user provides a unique username and password that are digitally bound to the user's email address, which is also unique. In the case a user is an applicant on a loan, then the user will be assigned "Questions" to answer. The questions may include documents to upload, text fields, or other data types that can pass information back to the lender. The data submitted in response to these questions is stored in the database instance assigned to that user and/or tenant. Each user is bound to one or more applications managed by the data aggregation server 102, and all data associated with that user is stored underneath the user's username within the platform. In the case the user is a lender, then the user's username and password are digitally bound to the company email address, which is unique. Any data package the user creates becomes visible when the user logs into the system under their username.

All data within the data aggregation platform 106 is stored on a cloud-based database. The data is stored together and credentialed by username. Data is classified based on which username created the "question" and which username answered the "question." The questions function as data buckets, wherein a data bucket is created for a certain document, text response, or other response, and the data bucket is filled when a user responds to the question. Data is further classified based on what type of document the data is and which data package the data applies to. All this information is stored in the metadata store 116.

The data aggregation platform 104 logically classifies data that is ingested from disparate sources and then partitions the data with assigned partitions across the multiple database instances. The data aggregation server 102 classifies data, controls user access, ensures privacy between users and their communications, and tags all data collected in the lending process both from the loan applicant users as well as any connected third-party aggregator such as Equifax®, Transunion®, Experian®, and combines into a single standard data package structure. The data may additionally be exported in a desired format, such as one or more PDF documents. The one or more PDF summary documents may logically link major data sections for easy access and readability by bank management and committee members.

The system 100 resolves numerous pain points associated with broadscale applications and communications between separate parties. The system 100 may specifically be applied in the lending industry, including mortgage lending, private lending, and commercial lending. The system 100 enables lenders to regularly communicate with applicants and view a real-time data package pipeline. The data aggregation platform 106 provides a user interface to applicants and lenders to visualize where the data package is within the data package pipeline and to visualize the additional data that is required to process the data package. The data aggregation platform 106 oversees the retrieval of data and provides real-time insight to the applicant regarding what data must still be gathered. This ensures that officers do not need to spend significant time tracking down information and can instead focus on customer relationships and acquiring new data packages. The data aggregation platform 106 is a unified communication platform for all stakeholders; this ensures that applicants and officers no longer need to communicate with one another through email, chat, or text message. This increases the security of the data package by obviating the need to send private information, secure upload links, and other sensitive data through email.

The data aggregation server 102 may classify and re-classify data points based on user input. In an example implementation, the data aggregation platform 106 is rendered to manage numerous loans, including loan applications, disbursed loans, defaulted loans, and paid-off loans. The data aggregation server 102 partitions data for each loan and then may reclassify the data depending on the current status of the loan. The data classification may be used when the data aggregation server 102 renders a user interface for the data aggregation platform 106. Different loans, and the data associated with each loan, may be reclassified based on how the loan has progressed. The data aggregation server 102 may classify all datapoints using metadata stored in the metadata store 116 and/or alongside data within the various database instances.

Figure 3:
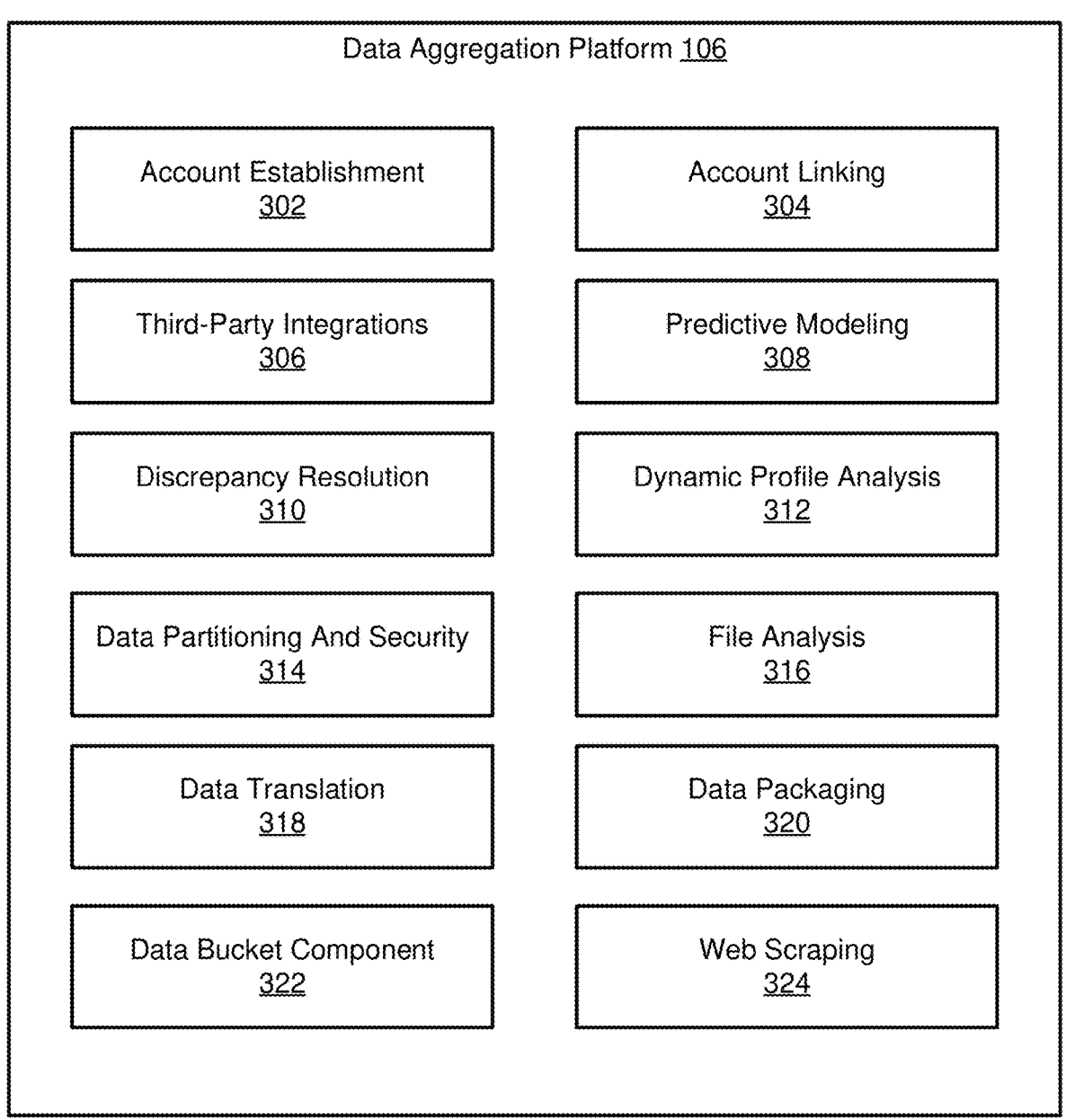
FIG. 3 is a schematic block diagram illustrating components of a data aggregation platform.

FIG. 3 is a schematic block diagram illustrating potential components of the data aggregation platform 106, including processes and modules executed by third parties in communication with the data aggregation server 102. The data aggregation platform 106 includes an account establishment 302 component and account linking 304 component for generating and linking user accounts within the platform 102. Linked user accounts may be associated with a common application or aggregated data package. The data aggregation platform 106 includes means for third-party integrations 306. The data aggregation platform 106 may include or communicate with an AI/ML engine 104 that performs predictive modeling 308. The data aggregation platform 106 includes a discrepancy resolution 310 module, dynamic profile analysis 312 module, and data partitioning and security module 314. The data aggregation platform 106 may include or communicate with an AI/ML engine 104 that performs file analysis 316. The data aggregation platform 106 includes a data translation 318 module, data packaging 320 module, data bucket component 322, and web scraping 324 module.

The account establishment 302 component is responsible for onboarding accounts within the data aggregation platform 106. Each account may be associated with a unique individual or entity. Different accounts will be assigned different permissions for accessing data stored on the database 114. The accounts may include, for example, administrator accounts with broader permissions to read and write data, and the accounts may include limited user accounts with limited permissions. Depending on the implementation of the data aggregation platform 106, the accounts may be specialized for certain tasks. For example, when the data aggregation platform 106 is implemented for calculating a real-time dynamic profile score for a data package, the accounts may include applicant accounts, officer accounts, underwriting accounts, lender management accounts, third-party administrator accounts, and so forth as needed.

The account establishment 302 component generates a new account to be associated with a unique dynamic profile and/or connects an existing account with the unique dynamic profile. The data aggregation platform 106 will permit an account to read and/or write data associated with the unique dynamic profile only if the account has been formally associated with the unique dynamic profile by the account establishment 302 component.

In an example implementation, the data aggregation platform 106 generates a dynamic profile for a commercial data package. In this example, the account establishment 302 component is activated when a lender logs into the data aggregation platform 106 and invites applicants to the commercial data package. The account establishment 302 component generates a notification, such as an email or text message, and sends the notification to the applicants. The notification may be sent from the lender and include branding or trademarks associated with the lender. The applicants authenticate their identities and consent to the terms and conditions of the data aggregation platform 106. The account establishment 302 component assigns permissions to each of the applicants with respect to the commercial data package. The accounts establishment 302 component retrieves data from the applicants, including, for example, loan type and purpose, real estate address, loan amount, loan name, applicant name, applicant email, applicant phone, other applicant contact information, names and contact information of additional applicants, names and contact information of spouses or partners, employment information, and so forth.

The account establishment 302 component allows an onboarded client to create a bespoke user interface that works best for that client's needs. Specifically, the account establishment 302 component allows the client to indicate which files should be requested for each application type and each applicant type. For example, the onboarded client may indicate that a unique set of files and data inputs should be requested for construction loans, commercial building loans, residential building loans, business loans, home equity loans, and so forth. Additionally, the onboarded client may indicate that a unique set of files and data inputs should be requested for individual applicants, business applications, and trust applications. Further, the onboarded client may indicate that a unique set of files and data inputs should be requested for different business structures such as LLC, PLLCs, partnerships, corporations, and so forth. The onboarded client may further indicate that a unique set of files and data inputs should be requested for loans that must comply with regulatory formatting, such as Small Business Association (SBA) loans.

The onboarded client may further adjust and customize the user interface by indicating how data should be categorized and displayed. The onboarded client may adjust the columns displayed in certain high-level overviews of multiple pending applications or loans. The onboarded client may adjust the data to be rendered on detail views and other overview views of applications, loans, documents, data inputs, and so forth.

The account linking 304 component associates accounts with a unique dynamic profile. The unique dynamic profile may be prepared in connection with a commercial data package, a school data package, a private data package, a government grant data package, a request for proposals, and so forth. The account linking 304 component identifies a storage component of the database 114 (such as a table or grouping of tables) that are associated with the unique dynamic profile. The account linking 304 component assigns permissions to the applicable accounts to access at least a portion of the data stored in the database 114 for the unique dynamic profile. The account linking 304 components may independently assign read and write permissions to data stored on the database 114 for the unique dynamic profile.

The third-party integrations 306 component establishes secure connections with third-party aggregators. The third-party integrations 306 component stores a listing of authorized machines, devices, and accounts (i.e., "whitelisted"). The data aggregation server 102 securely communicates with outside parties by way of secure API access points.

In an implementation, the system 100 is implemented for ingesting, storing, tracking, and analyzing data used for a data package such as a commercial lending application. In this implementation, the third-party integrations 306 component of the data aggregation server 102 communicates with one or more credit reporting agencies, such as TransUnion®, Equifax®, Experian®, or Thomson Reuters (CLEAR) to retrieve a current listing of a user's financial obligations and a current credit score for the user. The data aggregation server 102 May communicate with the credit reporting agency one time per day (or some other time interval) to continually update a dynamic profile associated with the user's data package. The data aggregation server 102 translates the data retrieved from the credit reporting agency from XML to PDF, JSON, and so forth as needed.

Further to the above-recited implementation, wherein the data aggregation platform 106 prepares data for a commercial lending application, the third-party integration 306 component retrieves background information about a user or entity from a third-party agency. The third-party agency may include, for example, TransUnion TLOxp® or Thomson Reuters CLEAR®. The data aggregation server 102 may communicate with the background data agency one time per day (or some other time interval) to continually update the dynamic profile associated with the user's data package. The data aggregation server 102 translates the data retrieved from the background data agency from XML to PDF, dynamic application questions, related entity graph structures, and ownership structures. The data aggregation server 102 retrieves the background information from the background data agency and generates an ownership structure and/or related entity graph that illustrates the user's ownership of various entities and assets. The data aggregation server 102 renders a user interface displaying the ownership structure and/or related entity graph on the data aggregation platform 106.

Further to the above-recited implementation, wherein the data aggregation platform 106 prepares data for a commercial lending application, the third-party integration 306 component retrieves real-time banking and asset information about a user or entity from a third-party agency. The third-party agency may include, for example, the user's personal banking institution, the user's personal mortgage servicer, the user's personal brokerage institution, business, or personal accounting software for managing the user's assets, and so forth. The financial institutions and account software may be associated with the user individually and/or businesses or other entities associated with the user. The data aggregation server 102 may communicate with the financial institution or accounting software one time per hour (or some other time interval) to continually update the dynamic profile associated with the user's data package. The data aggregation server 102 translates the data retrieved from the financial institution or accounting software from XML to PDF, credit spreading, and credit profile. The data aggregation server 102 retrieves the real-time financial information from the financial institutions and accounting software to render a user interface that provides a visualization of the user's credit spreading and credit profile.

The data aggregation server 102 may include or communicate with an AI/ML engine 104 that performs predictive modeling 308. The AI/ML engine 140 analyzes data to identify trends applicable to the dynamic profile or aggregated data package. The predictive modeling 308 outputs improved workflows to be executed by the data aggregation server 102 that may be uniquely optimized for each customer account. In an implementation, the data aggregation platform 106 presents the dynamic profile for determining whether applicants should be approved for a commercial data package.

The AI/ML engine 104 that performs the predictive modeling 308 may include an analysis of variance (ANOVA) statistical model. ANOVA is a collection of statistical models and their associated estimation procedures used to analyze the differences among means. ANOVA is based on the law of total variance, where the observed variance in a particular variable is partitioned into components attributable to diverse sources of variation.

The AI/ML engine 104 that performs the predictive modeling 308 may include a long short-term memory (LSTM) artificial neural network architecture. LSTM is an artificial recurrent neural network. Unlike standard feedforward neural networks, LSTM has feedback connection. The LSTM architecture can process single data points (such as images) and can further process sequences of data (such as speech or video). The LSTM architecture includes a cell, an input gate, an output gate, and a forget gate. The cell remembers values over arbitrary time intervals and the three gates regulate the flow of information into and out of the cell.

The AI/ML engine 104 that performs the predictive modeling 308 may include a recurrent neural network (RNN)

architecture. The RNN architecture may be particularly implemented for modeling upcoming procedures and predicting future item usage based on past procedures. The RNN architecture is a class of artificial neural networks where connections between nodes form a directed graph along a temporal sequence. This allows the RNN to exhibit temporal dynamic behavior. RNNs can use an internal state (memory) to process variable length sequences of inputs.

The AI/ML engine 104 that performs the predictive modeling 308 may be configured to adjust parameters for the dynamic profile analysis 312 based on historical data for loan applications, loan approvals, loan defaults, and loan completions. In an example implementation, the predictive modeling neural network 308 tracks the data inputs for loans that are granted or denied by a certain lending institution, and then continues to track which of the granted loans ended in default or complete payoff. The predictive modeling neural network 308 than adjusts the parameters for scoring each loan application based on whether historical loans ended in default.

The discrepancy resolution 310 component identifies discrepancies in the data stored on the database 114. The discrepancy resolution 310 component may be configured to identify discrepancies only within a single dynamic profile. For example, in the case of a commercial data package, the discrepancy resolution 310 component identifies conflicting datapoints associated with that commercial data package. The discrepancy resolution 310 component may communicate with the AI/ML engine 104 that performs file analysis 316 to determine that data manually input by the user conflicts with information presented in documents that have been uploaded by the user.

In an implementation, the data aggregation platform 106 aggregates and manages data for discrete aggregated data packages. Each of the discrete aggregated data packages may include an application, such as a commercial loan application for one applicant or group of applicants. The discrepancy resolution 310 component identifies discrepancies within the data within a single aggregated data package. In an example implementation, the aggregated data package is a commercial loan application for three applicants. The aggregated data package includes a plurality of data buckets for receiving different structured and unstructured data, including, for example, images of government-issued identifications, tax returns, secure real-time connections to banks, credit units, brokerages, and so forth to aggregate financial data, information regarding assets, and so forth. The discrepancy resolution 310 component determines whether any two or more data points within the aggregated data package are inconsistent with one another or contradict one another. For example, an applicant's government-issued identification may include an address, name, or date of birth that is inconsistent with the address, name, or date of birth that was manually supplied by the applicant or as aggregated from the Credit Reporting Agency The discrepancy resolution 310 component generates a notification when a data discrepancy has been identified. The notification may include a workflow trigger to execute a software agent (computer-implemented) configured to automatically retrieve additional information pertaining to the aggregated data package and/or request additional information for the aggregated data package. The notification may include a notification to a human user or operator, such as an applicant, loan officer, software administrator, backend administrator, manager, and so forth.

The discrepancy resolution 310 component identifies discrepancies between data within the aggregated data package, and what is required or requested to approve the aggregated data package. This feature may be implemented particularly when the aggregated data package is a loan application. In an example implementation, the predictive modeling neural network 308 outputs parameters indicating a high likelihood that a loan application will be approved by a certain customer account (i.e., a certain bank, credit union, or other lending institution). An applicant prepares an aggregated data package to be submitted to this certain customer account to seek a loan. The discrepancy resolution 310 component assesses the data within the applicant's aggregated data package and compares that data against the output from the predictive modeling neural network 308. The discrepancy resolution 310 component determines whether the aggregated data package is deficient based on the requirements predicted by the predictive modeling neural network 308.

The dynamic profile analysis 312 component prepares a dynamic profile and generates a profile score based on the accumulation of data associated with the dynamic profile. In some implementations, the dynamic profile presents data gathered for a data package. In this implementation, the dynamic profile analysis 312 component generates a profile score based on the accumulation of data acquired in connection with the commercial data package. This data may include, for example, demographic information for each applicant, financial obligations and exposures for each applicant and the businesses owned by each applicant, financial assets owned by each applicant and the businesses owned by each applicant, credit score and credit history information for each applicant, and so forth. The dynamic profile analysis 312 component calculates one or more dynamic scores for the commercial data package based on the data, including, for example, an overall score indicating whether a loan application complies with a lending institutions criteria for loans or for example, whether an applicant demonstrates any inconsistencies with a lending institution's criteria or is a "safe" applicant based on a lending institution's standards, a score including the overall debt-to-income ratios for the applicants, and so forth.

The data partitioning and security 314 component ingests, normalizes, partitions, and assigns security permissions to the data stored on the database 114. Database permissions are assigned with an authorization system that uses one or more of unique username, email address, phone number, and password assigned to a user. The data partitioning and security 314 component may additional implement two-factor authentication or multi-factor authentication protocols. The permissions metadata is stored in two or more database instances. This permissions metadata indicates what data each user is permitted to read and/or write to.

The data partitioning and security 314 component additionally applies customized permissions to data inputs and files stored within the database 114 to enable those data inputs and files to be used across applications and across clients. In an example implementation, an applicant provides data for a complete loan package, including typed data inputs, data selections, and uploaded files. The applicant may indicate that all or a portion of the data for the complete loan package should be copied and provided to other clients managed by the data aggregation platform 106. This may be useful to the applicant if the applicant is applying for a loan with multiple companies. In this case, if the data aggregation server 102 manages loan applications for multiple lenders, then the applicant's loan package may be copied to separate database instances for each of one or more lenders managed by the data aggregation server 102. Additionally, the data aggregation server 102 may maintain a single copy of the loan package, and simply apply different permissions to the data so that multiple lenders within the data aggregation platform 106 may view the data.

The AI/ML engine 104 that performs file analysis 316 identifies objects of interest and textual characters in unstructured data. An unstructured file (or unstructured data) includes information that does not have a pre-defined data model or is not organized in a pre-defined manner. Unstructured files may be human generated, or machine generated. Examples of unstructured files includes, for example, audio files, video files, images, Microsoft® Word documents, Microsoft® PowerPoint®, emails, chat message logs, data from social networking sites, text messages, locations, call recordings, portable document format (PDF) files, images, or scans of hardcopy documents, and so forth.

The AI/ML engine 104 that performs file analysis 316 may include a neural network trained to identify and/or classify objects of interest within image or video data. The AI/ML engine 104 that performs file analysis 316 may include a neural network trained to identify and/or classify words or music recorded in audio data. The AI/ML engine 104 that performs file analysis 316 may include a neural network trained to identify textual characters and words in an image, scan, video stream, or other form of unstructured data.

The AI/ML engine 104 that performs file analysis 316 includes a machine learning algorithm trained to execute optical character recognition processes to identify one or more words or textual characters in an unstructured file. Textual characters include letters, numbers, punctuation characters, emojis, and other characters. The AI/ML engine 104 is trained to "read" an unstructured file to identify textual characters and/or words within the file, and further to classify the content of the textual characters and/or words within the file.

The AI/ML engine 104 that performs file analysis 316 performs optical character recognition to identify one or more textual characters and/or words within an unstructured file. In an example implementation, the AI/ML engine 104 is fed an unstructured file that comprises an image or scan of a document, such as a tax document, a company incorporation document, a contract, a financial statement, and so forth. The AI/ML engine 104 performs the optical character recognition to identify textual characters within the unstructured file. The AI/ML engine 104 may additionally include a large language model (LLM) configured to process the textual characters and then classify the unstructured file. The LLM may classify the file as, for example, a tax document, financial statement, contract, and so forth. The LLM may further be configured to identify the names, addresses, contact information, demographic information, and so forth, of individuals, businesses, and assets identified within the unstructured file.

Optical character recognition automatically analyzes printed and/or handwritten textual characters and translates those characters into a form that a computer can process and understand. Optical character recognition includes the process of turning a picture or scan of text into text itself, or in other words, translating an image (or other unstructured data file) into a text file, such as a TXT or DOC file. The AI/ML engine 104 that performs file analysis 316 is trained on a plurality of vast datasets comprising different fonts, diverse types of handwriting, different languages, different textual characters, and so forth.

The data translation 318 component analyzes data retrieved from disparate sources and classifies the information based on content. The data translation 318 component implements Optical Character Recognition (OCR) algorithms and builds a database of keyword or keyword pairs that uniquely certain documents. For example, certain keywords or keyword pairs identify documents or portions of documents as comprising a year, natural language statement, label, name, financial data, and other unique items. The data translation 318 component assigns an identity to a document based on the OCR output.

The data translation 318 component resolves a technical problem pertaining to identifying the correct keywords to ensure accurate classification of a document. If the data translation 318 component does not output the correct keywords or keyword pairs, then document may be misclassified and stored with incorrect metadata on the database.

The data translation 318 component is additionally configured to translate input data to a standardized format. In some cases, the standardized format is set by a government regulation or industry standard. For example, all data inputs for a loan application may be translated into the format required for a government loan such as a Small Business Administration (SBA) loan. The data translation 318 component may automatically retrieve data inputs from the loan application and then input those data inputs into the standardized form. The data translation 318 component may then output a fully formatted loan application that may be immediately submitted without further input by the applicant. The data translation 318 component may take the same set of data inputs and translate those data inputs into multiple different formats, depending on the applicant's request or the lender's needs.

The data packaging 320 component partitions data into discrete data packages, wherein each data package represents a specific application, event, or other organizational structure. In an implementation, each data package represents a commercial lending application, a real property lending application, an educational admissions application, a job application, a private lending application, a government lending application, a leasing application, and so forth. The data package includes an indication of which users are associated with the data package, an indication of the permissions and roles for each user associated with the data package, and an indication of what questions and rules are associated with the data package.

Each data package includes one or more "questions" that serve as data buckets for receiving a certain document, text response, file, or other data format. In an example implementation, wherein the data package represents a data package, the "questions" may include, for example, a data bucket for a tax return, a data bucket for a financial statement, data buckets for personal demographics information, data buckets for specific parameters or agreements, a data bucket for images or videos of property associated with the data package, and so forth. Each data bucket "question" may be filled with one or more "answers" to the question, wherein the answers include files, documents, text responses, and other data formats. The data package questions are generated by an administrator or other user assigned to the data package.

The data packaging 320 component is tenant-specific and may operate under different rules for different tenants. For example, a first tenant may establish rules for user permissions, which types of documents are accepted, how many of each type of document must be ingested, and so forth. The data packaging 320 component generates a shell for a data package that comprises one or more data bucket questions based on the tenant-specific parameters for the tenant assigned to that data package 320.

Each data package may be stored on a separate database instance (see Database Instances in FIG. 2) to ensure there is no crosstalk between various customer accounts and tenants. In an alternative embodiment, each data package may be stored across shared storage resources, and the read/write permissions for each data package are established on the metadata store 116.

The data packaging 320 component may generate a data package specific to a data package that is regulated by an administrative agency, the government, a corporate agency, or some other entity. In an example implementation, in the United States, the data packaging 320 component creates data packages for a Small Business Administration (SBA) loan type. This data package is configured to export data in the necessary formats associated with the SBA loan, including, for example, 504 and 7 (a) forms. The data package associated with the SBA loan will include an SBA folder structure that comprises certain permissions for the data stored therein, and further comprises defined formats for the data stored therein and exported to applicants and lenders associated with the data package.

The data packaging 320 component is further configured to automatically apply appropriate classifications, categorizations, and naming conventions to files and other data inputs provided to the data aggregation platform 106. The data packaging 320 component references customized file naming conventions for each client account, and then follows those customized naming conventions to automatically rename each file uploaded to the data aggregation platform 106.

In an example implementation, an applicant uploads a file within the user interface and indicates the file is a tax return. The data packaging 320 component will then adhere metadata to the file to indicate it is a tax return. Additionally, the data packaging 320 component will rename the file based on the customized naming conventions associated with the lender. The naming convention might indicate, for example, a loan identifier, a name of the application, a content of the file, and so forth.

The data bucket component 322 assigns data to certain data buckets associated with the aggregated data package. The aggregated data package includes a plurality of data buckets, wherein each data bucket is intended to be associated with data of a certain type and content. In an example implementation, the aggregated data package is a commercial loan application. In this example implementation, the aggregated data package may include one data bucket intending to receive an image of an applicant's government-issued identification, and another data bucket intending to receive a copy of the applicant's tax return, and so forth. The data buckets may be assigned to receive structured or unstructured data. One or more data buckets may be in communication with an API to continually receive updated information in real-time. In an embodiment, a data bucket includes a secure connection to a third-party aggregator such as a bank, credit union, lender, social media, government agency, and so forth.

The data bucket component 322 may receive an output from the file analysis neural network 316 comprising one or more textual characters and/or words that were extract from an unstructured file. The data bucket component 322 may then take those textual characters and/or words and assign them to individual data buckets associated with the aggregated data package. For example, if the aggregated data package is a commercial loan application, then the data bucket component 322 may receive a plurality of textual outputs from the file analysis neural network 316 that would read from an image, scan, PDF, etc. of an existing document. The data bucket component 322 receives these textual outputs and classifies and/or assigns them to a data bucket within the aggregated data package.

The data bucket component 322 assigns files to data buckets within various data models. The data bucket component 322 may integrate with a relational database model, a no-SQL data model, a parent-child relationship data model, and others. In an implementation, the aggregated data packages are stored in a parent-child relationship data model, wherein the parent is the aggregated data package, which includes numerous levels of child relationships. In an example implementation, the parent is a commercial loan application, the child is an applicant for the commercial loan application, and then numerous further child relationships are associated with the application, including for example, a child data bucket for the applicant's government-issued identification, name, address, contact information, age, assets, tax returns, and so forth.

The data bucket component 322 assigns metadata to each structured or unstructured file that it places within the data model. The data bucket component 322 ensures that each data point includes metadata associated with a certain aggregated data package.

The web scraping component 324 may be executed by an external third-party service in communication with the data aggregation server 102 and/or may be executed by the data aggregation server 102 itself. The web scraping component 324 performs data extraction for certain types of data across certain web pages. The web scraping component 324 may extract structured data from publicly accessible webpages, and from private webpages necessitating a secure login or connection.

The web scraping component 324 (may alternatively be referred to as a "data scraping" component) identifies, extracts, and saves data retrieved from webpages. The web scraping component 324 additionally "reads" that data and classifies the data based on its content. In an implementation, the web scraping component 324 additionally includes a discrepancy resolution 130 component to determine whether newly retrieved data should replace data that is currently stored on the data aggregation server 102.

The web scraping component 324 may communicate directly by way of Hypertext Transfer Protocol (HTTP) and may provide a script execution environment to simulate user interaction. The web scraping component 324 may utilize a web browser process to perform the HTTP communication and execute web scripts designed to render the HTML page for processing. In this case, the web scraping component 324 may execute the scripts it pulls rather than merely receive those scripts as text. This may be necessary on some web pages to enable the web scraping component 324 to convince those web pages that the web scraping component 324 is not a bot, because the scripts are running in a web browser.

The web scraping component 324 caches the content of the web pages its reads and performs additional scraping tasks against those web pages without requiring additional trips to the source web server. This reduces the network traffic and load on the server and may be necessary to obtain the information or to extract additional data.

Figures 4, 5:
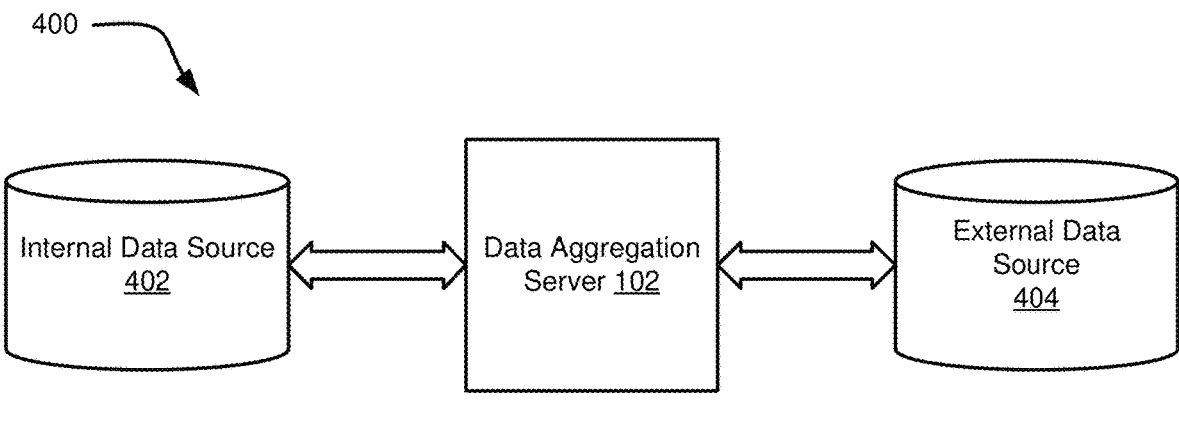
FIG. 4 is a schematic diagram of a system for data communication between a data aggregation server and internal and external data sources.
FIG. 5 is a schematic diagram of a system for performing electronic data security measures on data received from an external data source.

FIG. 4 is a schematic diagram of a system 400 for data communication between a data aggregation server 102 and internal and external data sources. The data aggregation server 102 may bidirectionally communicate with one or more of an internal data source 402 and an external data source 404. The data aggregation server 102 may receive confidential information, including personal identifying information, from outside sources, including directly from manual user input and from file transfer protocols from outside entities. The data aggregation server 102 may also provide confidential information to outside parties.

In an embodiment, the data aggregation server 102 communicates directly with an external data source 404 that is managed or owned by a third-party entity. The data aggregation server 102 may communicate by way of SSL-encrypted HTTP connections. In an embodiment, the external data source 404 is a relational database, and the data aggregation server 102 communicates with the relational database by way of an Application Program Interface (API). In an embodiment, the external data source 404 is an encrypted hard drive that has been shared with the data aggregation server 102. In an embodiment, the external data source 404 is a virtual data center, and the data aggregation server 102 access the data on a virtual server after signing in or undergoing some other authentication step.

In an embodiment, the data aggregation server 102 communicates with an internal data source 402 that is not managed by some other third-party entity. The internal data source 402 may include a file that has been downloaded or otherwise received from some third-party entity. After the file has been downloaded, the file can be managed and manipulated by the data aggregation server 102. The internal data source 402 may include an encrypted hard drive that is provided by a third-party.

In an embodiment, the data stored in the internal data source 402 has been "cleaned" or pared down to only include necessary or critical information. This can be beneficial to ensure the totality of the data is a usable size that can be efficiently queried, analyzed, and manipulated. For example, the raw data retrieved from the external data source 404 may include numerous data fields that are not necessary. The unnecessary data may be eliminated, and only the necessary data may be stored on the database 112.

The data aggregation server 102, or some other module in communication with the data aggregation server 102, may create intermediary files or tables within a relational database. The intermediary files or tables may include certain information columns that are pertinent to answer a specific question. This can be beneficial to ensure that each intermediary file or table is no bigger than it needs to be to include all necessary information for answering the specific question. This decreases the amount of disc storage and/or Random-Access Memory (RAM) needed to analyze the information and calculate the answer to the specific question.

FIG. 5 is a schematic diagram of a system and method 500 for performing electronic data security measures on data received from the external data source 404. In some cases, the data may be private or encrypted, such as item-use data for procedures that were performed in the past. This data may be received as part of a healthcare claim and may include private or personal information.

In an embodiment, the data aggregation server 102 receives data 502 by securely communicating with a virtual data center. The protocol for receiving the data 502 from the external data source 404 involves electronic data security measures 504. In an embodiment, an account may be created for a user associated with the data aggregation server 102, and the user could sign into the virtual data center with the account. The user could then access the data stored in the virtual data center by way of the account. The data may be encrypted or non-encrypted based on the security measures of the virtual data center. In an embodiment, the data may be non-encrypted when viewed by way of a network connection, and the data may be encrypted if downloaded for offline use and manipulation. If the data is downloaded in an encrypted form, then the data must be de-encrypted prior to analysis and manipulation.

In an embodiment, the data aggregation server 102 receives data by way of an encrypted hard drive. The encrypted hard drive may be provided by the source of the data, such as private or public healthcare entity. In an embodiment, the data aggregation server 102 receives claims data by way of an encrypted file that has been downloaded by way of a network connection. The data aggregation server 102 undergoes an electronic data security measure 404 by de-encrypting the claims data.

Figure 6A:
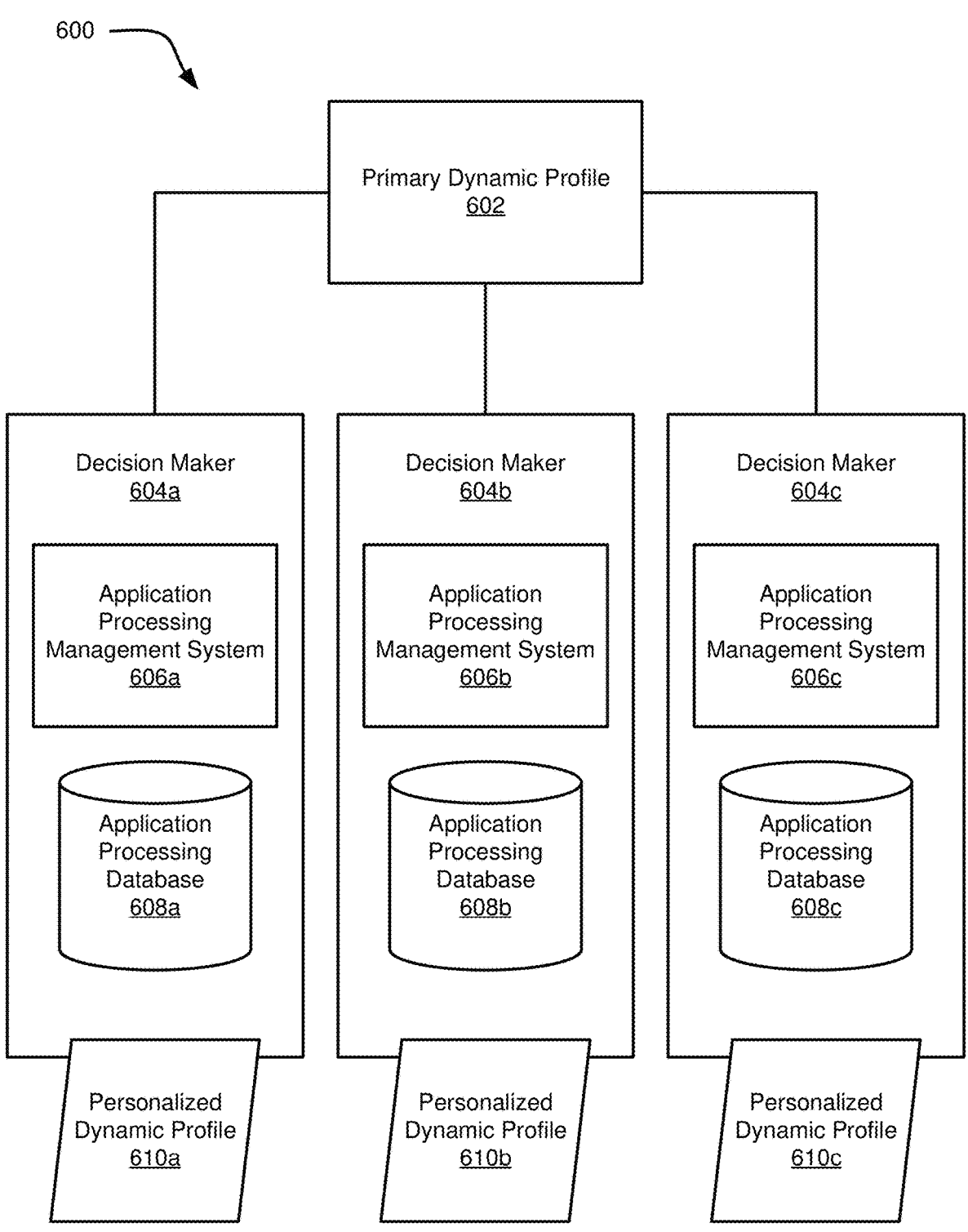
FIG. 6A is a schematic block diagram of a system and method for applying a primary dynamic profile to one or more decision makers.
Figure 6B:
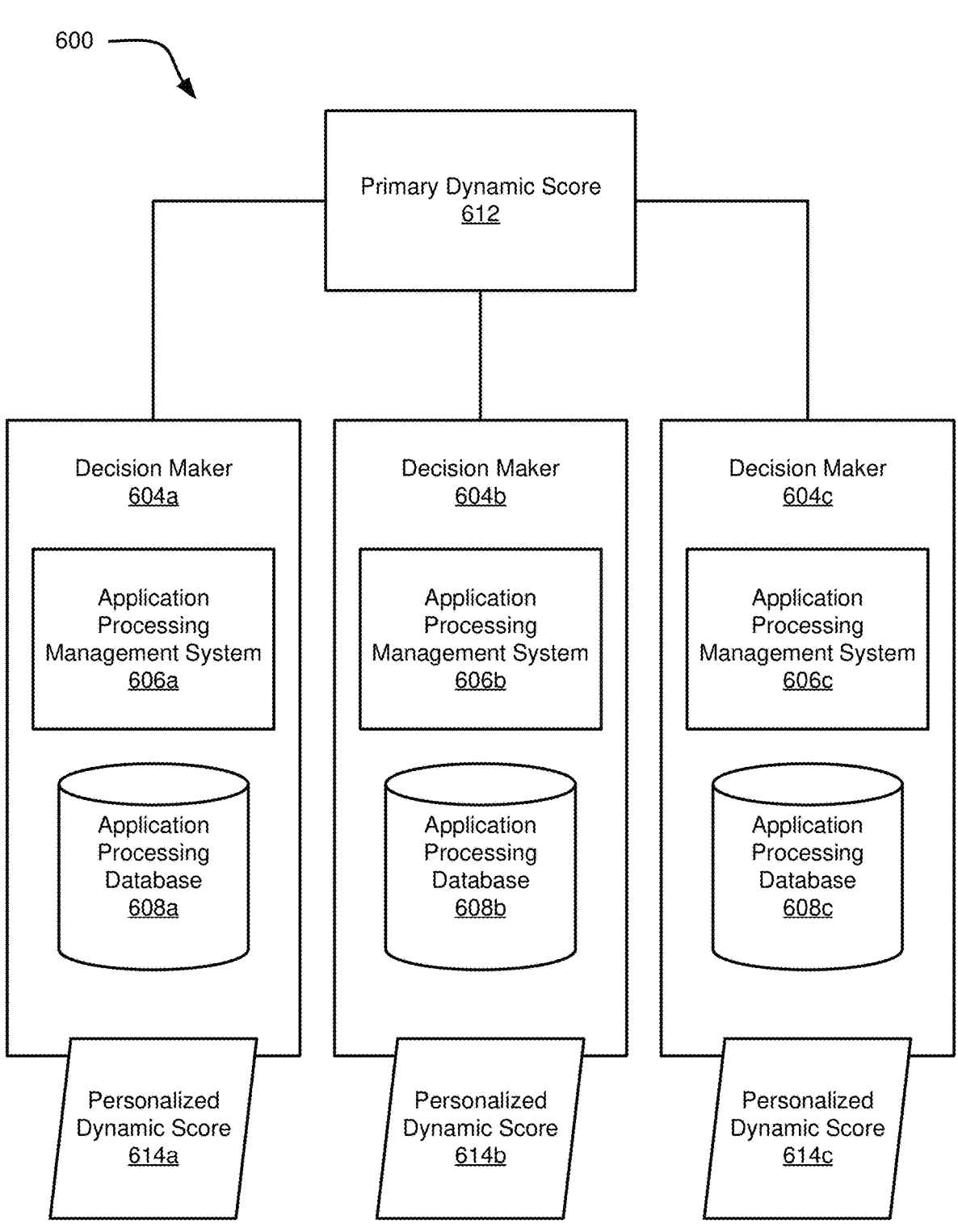
FIG. 6B is a schematic block diagram of a system and method for applying a primary dynamic score to one or more decision makers.

FIGS. 6A and 6B are schematic block diagram of a system 600 and method for presenting a primary dynamic profile 602 (see FIG. 6A) or a primary dynamic score 612 (see FIG. 6B) to one or more decision makers 604*a*, 604*b*, 604*c* (may be generically referred to herein as a decision maker 604). The data aggregation server 102 communicates with application processing management systems 606 (see 606*a*, 606*b*, 606*c*) associated with different decision makers 604. The data aggregation server 102 additionally communicates with one or more application processing databases 608 (see 608*a*, 608*b*, 608*c*) associated with those decision makers 604. The data aggregation server 102 may generate a unique personalized dynamic profile 610*a*, 610*b*, 610*c* (see FIG. 6A) or unique personalized dynamic score 614*a*, 614*b*, 614*c* (see FIG. 6B) for each of the decision makers 604.

In an example implementation, the dynamic profile 602 presents information to be used for determining whether to grant a loan to one or more applicants. In this implementation, the decision makers 604 include independent banking or lending institutions. Each decision maker 604 may have its own protocols and requirements for determining whether to grant a commercial loan. The data aggregation server 102 tailors each of the personalized dynamic profiles 610 for the respective decision maker 604. The applicants for the commercial loan may provide information to the data aggregation platform 106 to generate the primary dynamic profile 602. The applicants may then elect to share the data associated with the primary dynamic profile 602 with a plurality of independent decision makers 604. This enables the applicants to apply for a loan with multiple different lending institutions without filling out separate applications. In some cases, the applicant may be required to submit institution-specific application questions due to bank or regulatory compliance requirements, but other components of the application may be automatically provided by the data aggregation platform 106.

In an example implementation, the primary dynamic score 612 presents a numerical score for use in determining whether to grant a loan to one or more applicants. The primary dynamic score 612 quantifies the bankability and/or completeness of a loan application. The primary dynamic score 612 is calculated based on global scoring thresholds and metrics that may be presumed to apply to numerous decision makers 604. The personalized dynamic scores 614 quantify the bankability and/or completeness of a loan application based on the unique thresholds and metrics associated with the various decision makers 604. For example, one decision maker 604 may require more information or documents than another decision maker 604, and thus, the quantified completeness score may differ between the two decision makers 604. Further for example, one decision maker 604 may have different thresholds for bankability based on, for example, the assets of an applicant, the work history of an applicant, the demographics of an applicant, and so forth. Thus, this decision maker 604 may have a quantified bankability score that differs from the primary dynamic score 612.

In an example implementation, the decision makers 604 are commercial lenders. Each of the commercial lenders may separately indicate that the data aggregation platform 106 will be utilized to accept loan applications from different types of applicants, such as individuals, companies, and trusts. Each of the commercial lenders (see decision makers 604) indicates which documents will be required from different types of applicants, and which documents will be required for different types of loans and loan parameters. For example, the data aggregation platform 106 will automatically request a different set of files from an individual applicant than a company or trust applicant. Further for example, if the LTV to LTC ratio falls above a certain threshold, then the data aggregation platform 106 may automatically request additional documentation for loan collateral, applicant assets, and so forth.

FIG. 7 is a schematic block diagram of a data flow 700 for calculating a dynamic score 712 and preparing a data presentation 704. The data input 702 for the dynamic score 712 and the data presentation 704 includes, for example, a business credit report, business financial statements, business tax returns, entity search, bank account statements, individual background checks, individual financial statements, individual tax returns, lien search, online reviews, business plans, applications, owners' credit reports, owners' or borrowers' social media accounts, images of financed assets, deal-specific documents, and corporate documents.

The process of calculating the personalized dynamic score 712 includes generating a loan recommendation based on various types of risk, such as financial risk, collateral risk, borrower risk, and so forth. These calculations are made based on a totality of files and data inputs provided by an applicant communicating with the data aggregation platform 106. The data aggregation server 102 translates data inputs and files into the required format for various types of loans, and then determines whether different types of loans should be approved based on loan-specific risk thresholds.

Figure 8:
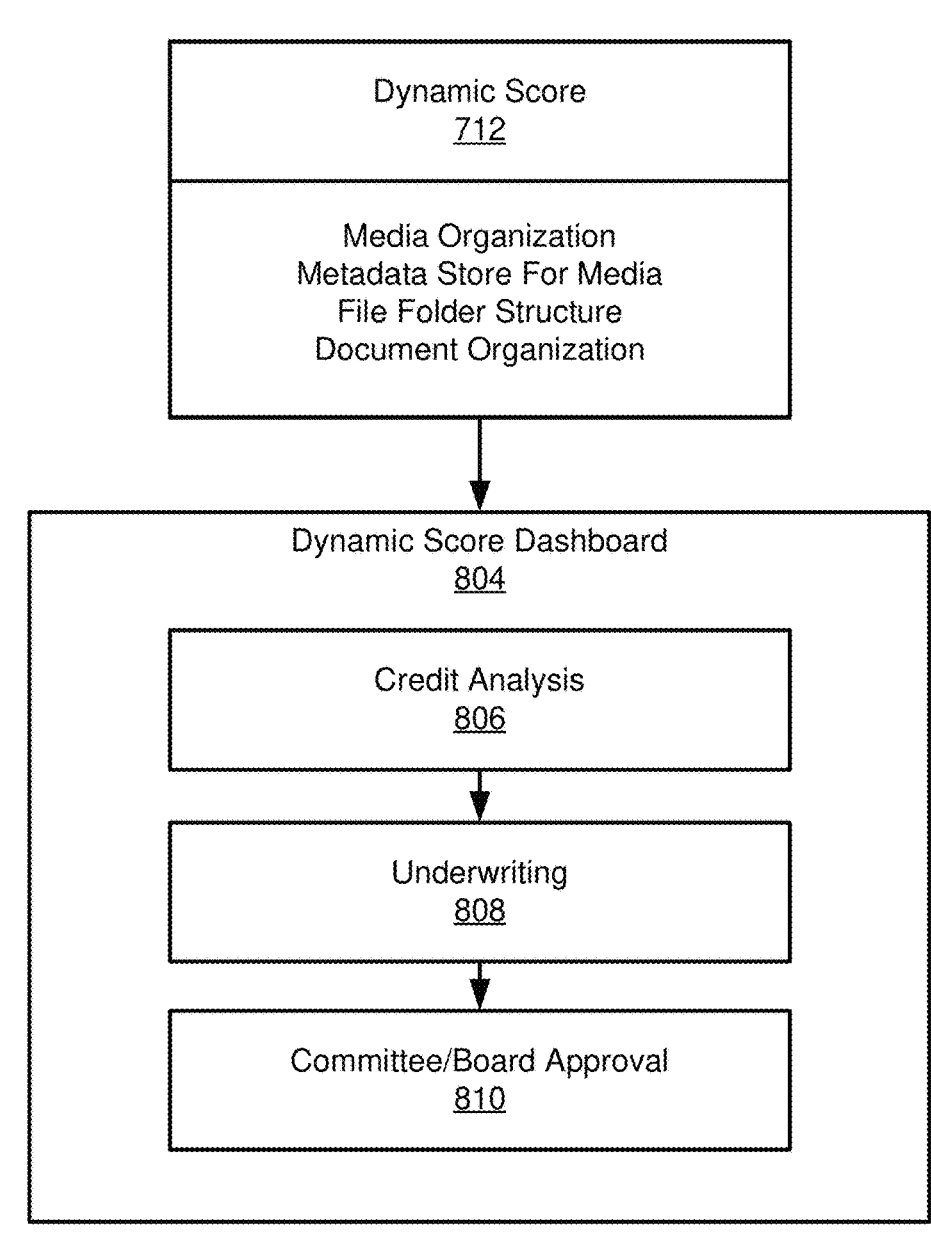
FIG. 8 is a schematic block diagram of a data flow and process flow for rendering a dynamic score dashboard.

FIG. 8 is a schematic diagram of a process flow 800 for generating a dynamic score 712 of an applicant and providing the dynamic score 712 to one or more parties for real-time decision making. The process flow 800 includes generating the dynamic score 712 for the account. The dynamic score 712 may be associated with one or more independent accounts.

In an implementation, the dynamic score 712 is prepared for a data package. The data package may be associated with one or more individuals or entities. In the case of a commercial loan, the applicants may include a plurality of individuals with ownership in the company applying for the loan and/or guarantors for the loan. The applicant may include the company itself or a plurality of companies applying together.

The process flow 800 includes rending a dynamic score dashboard 804 on a user interface. The dynamic score dashboard 804 may be accessed and used by credit analysis 806, underwriting 808, and committee/board approval 810 for determining whether to approve the applicant for commercial lending and how much funding to provide.

The dynamic score 712 is the principal output of the data aggregation platform 106 and serves as a roadmap for all parties associated with the data package, including the one or more borrowers and the one or more lenders. The dynamic score 712 provides insight into two primary elements of a data package, including bankability and data package completeness. The bankability score represents the degree to which the data package meets the lender's approval criteria. The data package completeness score represents the degree to which the required documentation has been collection for a request.

The bankability score is specifically defined as the degree to which a data package meets a lender's approval criteria. The lender's approval criteria may be stored on the database in a tenant-specific database instance and/or stored on the database and associated with a certain lender account. The bankability score includes two sub-categories of information, including the bank credit criteria and the red flag alerts.

The bank credit criteria are associated with a specific lender. The data aggregation platform 106 creates a table that comprises the criteria associated with the lender, and thus, the bankability score for that data package is tailored to the lender overseeing the data package. The lender may revise its lending criteria as their needs change. The dynamic score 712 provides a progressive evaluation of each loan request's compliance with the lender's criteria.

The bankability score further includes red flag alerts. The red flag alerts including a listing of items that are below the lender's criteria thresholds, inconsistent between data input sources, or require clarification or additional supporting information.

The completeness score is defined as the degree the required documentation for a request has been collected. The completeness score is represented as a checklist of documents required for each data package-type.

The dynamic score 712 compiles metrics for the one or more borrowers, owners, guarantors, creditors, entities, financial entities, and asset entities. The dynamic score 712 is calculated by the data aggregation platform 106 and organized into a report that is provided to the lender and/or applicant. The dynamic score 712 is calculated for each request in real-time against a lender's specific approval criteria. The dynamic score 712 is updated as information is ingested, translated, normalized, and partitioned across the data aggregation platform 106.

The dynamic score 712 indicates the data package's compliance with the lender's criteria thresholds. The dynamic score 712 further attaches a red flag to certain items that require clarification or additional information. The data aggregation platform 106 calculates an internal "credit score" to indicate probability of approval of the data package. The dynamic score 712 presents a checklist indicating the completeness of the data package and the further required documentation. The dynamic score 712 serves as the main "source of truth" for the officer and borrower. The dynamic score 712 comprises permissions indicating which aspects of the dynamic score 712 are accessible by various parties associated with the data package for the data package. The individual elements of the dynamic score 712 are permissioned on a "need to know" basis for either the borrower or the lender. The dynamic score 712 includes outputs of the data aggregation platform 106 and presents these outputs in separate sections and pages. The dynamic score 712 serves as a foundation for an approval presentation package in subsequent releases.

Figure 9:
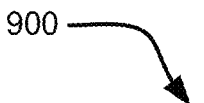
FIG. 9 is a schematic block diagram of a dataflow for training a neural network, providing input data to the neural network, and receiving an output calculation from the neural network.

FIG. 9 is a schematic block diagram of a dataflow 900 for training the AI/ML engine 104, providing input data to the AI/ML engine 104, and receiving an output calculation from the AI/ML engine 104. The AI/ML engine 104 described herein may be trained based on a training dataset 902 and may provide an output based on an input dataset 904. The content of the training dataset 902 and the input dataset 904 is specific to the applicable use-case for the dynamic profile and the data aggregation platform 106. The AI/ML engine 104 outputs a prediction applicable to the training and input datasets. FIG. 9 is specifically directed to an example implementation wherein the data aggregation platform 106 prepares dynamic profiles for applicants seeking a commercial loan.

In the example illustrated in FIG. 9, the training dataset 902 may include historical lending data, historical business data, historical preference data, historical workflow data, historical demographic data, and other as needed. The input dataset 904 may be lender-specific and/or applicant-specific and may include, for example, applicant data (e.g., demographic data about the applicant, documents submitted by the data package, and other information about the applicant), obligations and exposures data, current funding data, loans-to-date data, and preference data. The AI/ML engine 104 may output predictive modeling neural network 308 that indicates a prediction for whether the applicant is likely to receive funding from a specific institution, whether a specific institution has available funding now or will likely have available funding in the future, whether a specific institution is likely to approve funding for the applicant's type of business, and so forth as needed.

The AI/ML engine 104 is further implemented to measure performance of the data package after a decision has been made on whether to approve or deny the loan. The approve/deny feedback is captured and fed back into the AI/ML engine 104 to optimize decision making based on data package performance.

Additionally, the AI/ML engine 104 is implemented to perform predictive modeling based on the datasets have been ingested and aggregated into a data package. In an example implementation, the AI/ML engine 104 determines the average length of a commercial lending data package close time in day based on loan type, applicant type, geolocation, lender profile, or other quantitative measures that are tracked within the data aggregation platform 106. In a further example implementation, the AI/ML engine 104 outputs information regarding underwriting and approval/denial of the data package based on the datasets that are ingested and the data package volume that will be processed. The AI/ML engine 104 quantifies decisions for accuracy and compares those decision to other similar data packages to predict the likelihood of default (or other outcomes) as data is collected over the usage life of the data aggregation platform 106 for both applicants and lenders.

The data aggregation server 102 automatically renames uploaded files (see input dataset 904) based on a client naming convention. For example, a user may upload a series of images that each have a generic image file name. The data aggregation server 102 will automatically rename each of the images based on which loan they were added to and how they were classified within a user interface of the data aggregation platform 106. If the user uploaded the images as "Property Photos" for a certain address, then the data aggregation platform 106 will automatically rename the images based on the preferred naming convention for property photos. This preferred naming convention may be customized by each client account based on internal preferences. The naming conventions may be personalized to each decision maker (see 604 at FIG. 6) and may additionally be customized to be understood by the AI/ML engine 104.

Figure 10:
FIG. 10 is a schematic block diagram of exemplary components of a user interface rendered by a data aggregation platform, and further of bidirectional communication between a data aggregation platform and a plurality of data providers.

FIG. 10 is a schematic block diagram illustrating a system 1000 for displaying information to a use through a graphical user interface of the data aggregation platform 106, and further for bidirectional communications between the data aggregation platform 106 (operated by the data aggregation server 102) and a plurality of data submitters. The system 1000 includes the data aggregation platform 106 as shown from the perspective of a data recipient. In an example use-case, the data recipient is a lender or central repository for collecting loan applications that may later be distributed to multiple different lenders.

The data aggregation platform 106 retrieves information from applicants 1010, which supply data and files to the data aggregation server 102. The data aggregation platform 106 retrieves information from decision makers 604, which may include, for example, indications of thresholds for approving or denying an application, indications of what types of data must be retrieved, indications of various types of accepted applications, and so forth. The data aggregation platform 106 retrieves information from third-party data verifiers 1012 to ensure the information received from applicants 1010 is correct and trustworthy. The data aggregation platform 106 retrieves information from data aggregators 1014, which may further corroborate information provided by applicants 1010.

The data aggregation platform 106 may include portals for viewing leads 1002, origination 1004, portfolio 1006, and archive 1008. The leads tab will open potential loan applications that have not yet been submitted, the origination tab will open loan applications that have originated but not yet been finalized, the portfolio tab will open existing loans, and the archive tab will open past loans. In an example use-case, the origination 1004 tab provides a comprehensive listing of pending loan applications. The graphical user interface of the data aggregation platform 106 may display, for example, the project name, purchase price, project costs, total costs, loan amount, loan-to-value (LTV) ratio, loan-to-cost (LTC) ratio, annual percentage rate (APR), loan term, and proposed closing date of the various pending applications.

The user interface for the data aggregation platform 106 may additionally include an information column with a hover button, wherein a user may hover a cursor of the information circle and view a high-level overview of that loan. The high-level overview may be rendered as an overlay over the origination table and may include additional information about the applicable loan. This information may include, for example, the loan identifier, origination date, loan type, loan status, assigned lenders, assigned employees, loan applicants, down payment, loan amount, amortization length, and loan progress. Again, the information in the hover overlay may be customized by the client account.

The data aggregation platform 106 enables a user to create a bespoke user interface tailored to the user's preferences and needs. Specifically, the user may indicate which major folders or classifiers should be present. In an example implementation, these classifiers include the leads 1002, origination 1004, portfolio 1006, and archive 1008 folders shown in FIG. 10, but these may be customized based on user needs. Additionally, the user may indicate which columns should be visible in a high-level table overview, and what data should be visible when hovering over an information column. Additionally, the user may pin rows or columns within the high-level table overview to certain positions or orderings. The user may sort based on columns and filter based on certain data points. The user may drag and slide columns and rows to different positions on the user interface as needed.

The user interface of the data aggregation platform 106 is interactive and enables a user to quickly add applicants, collateral, loan terms, companies, trusts, or team members directly from an overview page. For example, a user may click on the "Add" button within the applicant box and quickly add one or more applicants to the loan, such as individuals, companies, or trusts. Similarly, for example, the user may click on the "Add" button within the collateral box and add one or more collateral assets to the loan, such as buildings, construction, land, equipment, and so forth.

Each applicant or loan may have multiple entries for applicants, collateral, companies and trusts, and applicant team, and lending team. These entries may quickly be added, edited, and removed by a user by interacting with the user interface of the data aggregation platform 106. A user may add applicants, applicant team members, or lending team members by selecting individuals or entities that are already within the data aggregation platform 106. In an example implementation, a user begins to type the name of an individual or entity, and then the user interface of the data aggregation platform 106 automatically displays users or entities matching the typed input. The user may then select one of the displayed users or entities if they are correct. The applicants, applicant team members, and lending team members may be given different read and write permissions within the application, and these permissions may be configured by a manager of the application. In some cases, one or more users are deemed an administrator or manager of a certain application, and only these users are given the opportunity to adjust the read and/or write permissions of other parties associated with the application.

The user interface of the data aggregation platform 106 enables a user to quickly upload files for each of the requested documentation categories. The user may drag and drop files, select files from a hard drive or cloud-based filed system, or scan documents. The user may select on a requested file category (e.g., in FIG. 14 this may be the "Property Photos" for "123 East $2^{nd}$ Avenue") and then upload photos that will automatically be classified as property photos.

Figure 11:
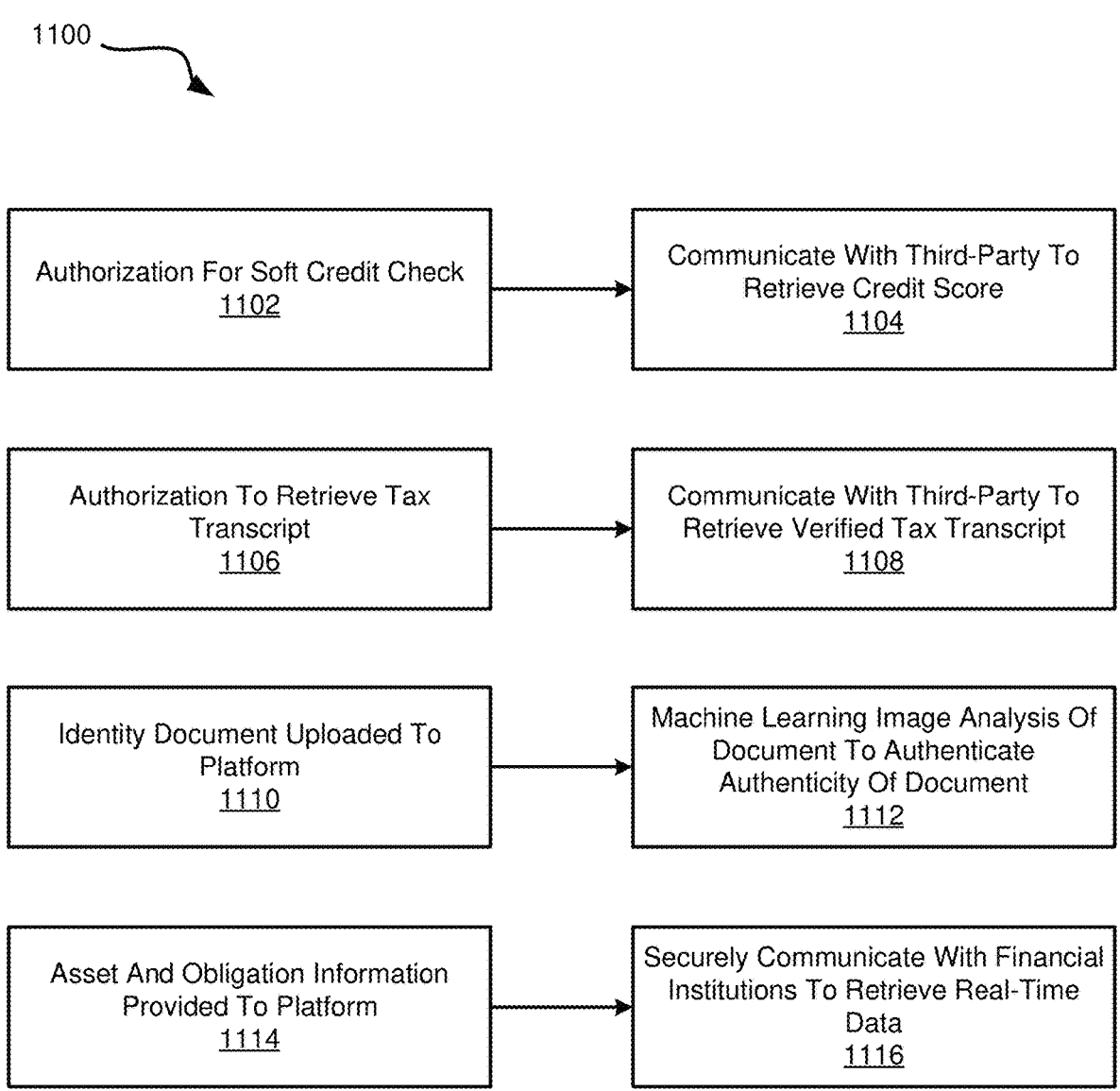
FIG. 11 is a schematic block diagram of a process flow for securely retrieving information to be stored in associated with an aggregated data package.

FIG. 11 illustrates methods of data analysis for authenticating a user's identity and authenticating data provided by a user. The methods illustrated in FIG. 11 may be specifically applicable when seeking to verify the user's financial assets and obligations, verify the user's tax history, verify the user's identity, and so forth in pursuance of determining whether to approve the user's data package.

The methods may include the user providing authorization at 1102 for the data aggregation platform 106 to execute a soft credit check on the user. The user may provide this authorization by digitally signing an indication that the user agrees to the soft credit check. The soft credit check may be executed by securely communicating at 1104 with a third party to retrieve the user's credit score.

The methods may include the user providing authorization at 1106 to retrieve the user's official tax transcript. The tax transcript may be retrieved by securely communicating at 1108 with a third party to retrieve the user's verified and officially filed tax transcript.

The methods may include the user uploading at 1110 an identity document to the data aggregation platform 106. The identity document may include, for example, an image of the user's government-issued identification, an image of the user's birth certificate, and so forth. The authenticity of the identity document may be verified by executing a machine learning algorithm at 1112 to analyze the document and determine the authenticity of the document. This may be done with an assistance of a third party.

The method may include the user securely providing at 1114 asset and obligation information to the data aggregation platform 106. This may include the user securely providing login credentials to access real-time asset and obligation data for the user at various financial institutions. The data aggregation platform 106 establishes a secure Application Program Interface (API) with the corresponding financial institutions, and when the user provides the login credentials for the corresponding financial institutions, the data aggregation platform 106 may then securely retrieve real-time asset and obligation information for the user from the corresponding financial institutions. The data aggregation server 104 securely communicates at 1116 with the financial institutions to retrieve real-time data.

Figure 12:
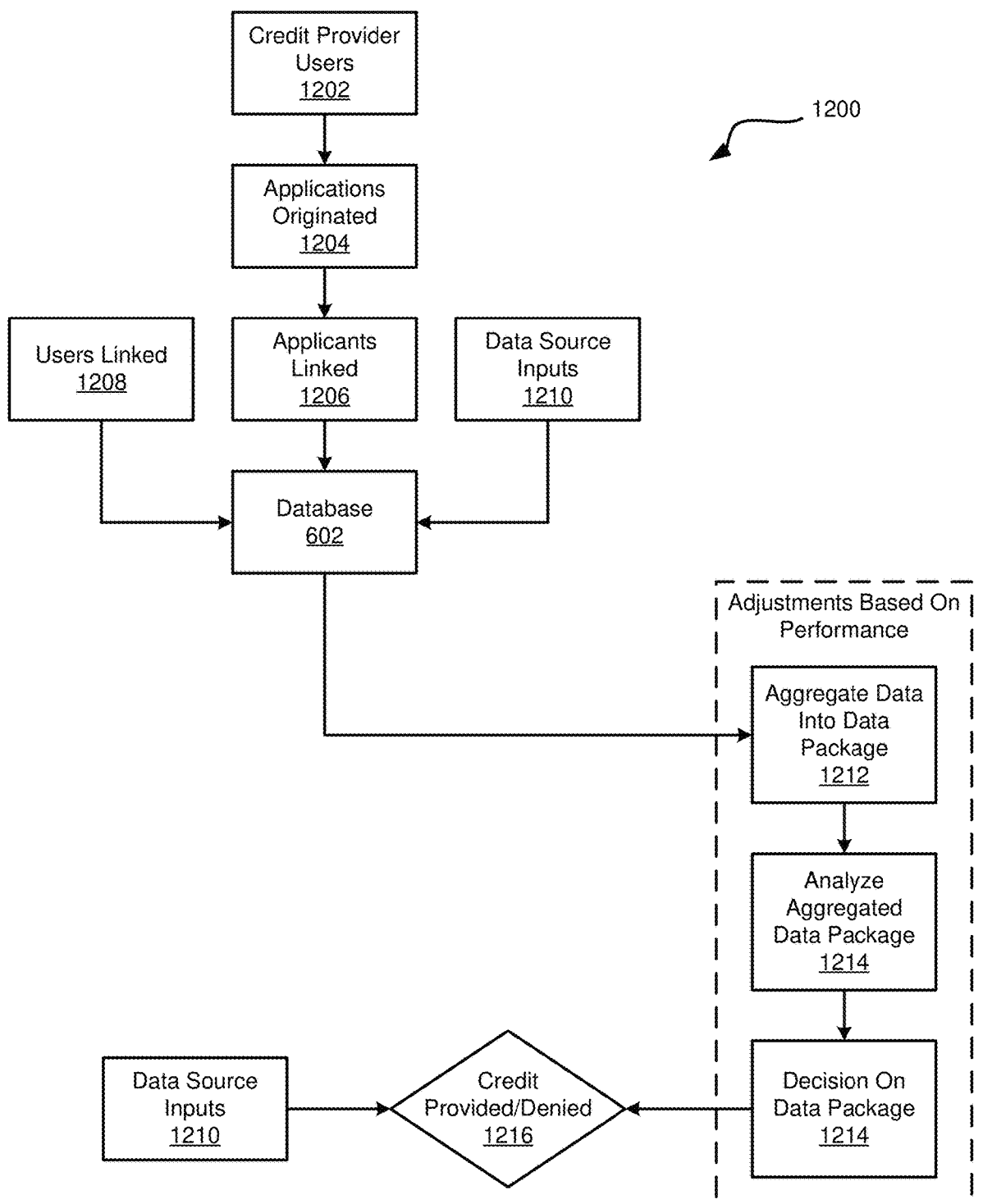
FIG. 12 is a schematic block diagram of a process flow for calculating a dynamic score and dynamic profile based on data retrieved from a plurality of disparate sources.

FIG. 12 is a schematic block diagram of a learning flow 1200 for aggregating data and generating a dynamic profile based on the ingested and aggregated data. The learning flow 1200 is implemented by the data aggregation platform 106 in connection with a cloud-based database 602.

The learning flow 1200 includes authenticating and linking credit provider user 1202 to the database 602. The database 602 is a cloud-based relational database, such as that described in FIGS. 6A-6B. The credit provider users 1202 generate one or more data packages 1204 within the data aggregation platform 106. The credit provider users 1202 cause the data aggregation platform 106 to generate secure links for linking one or more persons (users) to the data packages. The applicants are linked at 1206 and then given read and/or write permissions on the database 602.

One or more additional users are linked at 1208 and given read and/or write permissions on the database 602. These additional users may be given role-based access to the database 602 based on their role for a specific data package. For example, a user may be granted a "teammate" role for a first data package and may be granted a "principal" role on a second data package. In the first data package, the user is a teammate, i.e., helper such as an accountant, lawyer, real estate agent and so forth, and is linked to the data package to assist another user with completing that data package. In the second data package, the user is a principal to a data package, i.e., the user is personally applying on the data package.

Additionally, data source inputs 1210 are connected to the database 602. The data source inputs may communicate with the database 602 by way of an API or secure file transfer protocol. In an implementation, the data source inputs 1210 include, for example, consumer credit reports, business credit reports, bank data, brokerage data, accounting data, background data, criminal data, government registrations, social data, news data, asset data (stocks, bonds, equipment, intellectual property, and so forth), appraisal data, and so forth.

Data is retrieved and ingested into the database 602 via TLS and other encrypted methods. Third-party data may be accessed by way of a secure method and will have a user account to authenticate access. In the case of credit reports, each user possesses a unique code that is used to track when credit pulled on their behalf for the applicants. The ingested data includes "structured" digital data that is stored and logically parsed based on "questions" and "answers" within the data aggregation platform 106 for the data package and data package process. The data is retrieved securely upon request via an API and may arrive in an XML format.

The data package is established within the data aggregation platform 106. The data associated with the data package is aggregated on the database 602. Each datapoint associated with the data package is stored on the database 602 in connection with metadata indicating which data package the data is associated with, which users can read the data, which users can write to the data, when the data was uploaded, and so forth.

Adjustments are made to the data packages based on the data stored on the database 602. First, the data associated with the data package is aggregated into a data package 1212. In an implementation, the data package represents, for example, a commercial lending data package, a real estate lending data package, an education admissions data package, a job data package, and so forth. The learning flow 1200 further includes analyzing and aggregating the data package at 1214. The learning flow 1200 further includes providing a dynamic profile regarding the data package and the deciding on the data package 1214. In the case of a data package 1214 associated with a loan, credit is provided or denied at 1216 based on the decision on the data package 1214. Credit may be provided and denied at 1216 further based on the data source inputs 1210.

Figure 13:
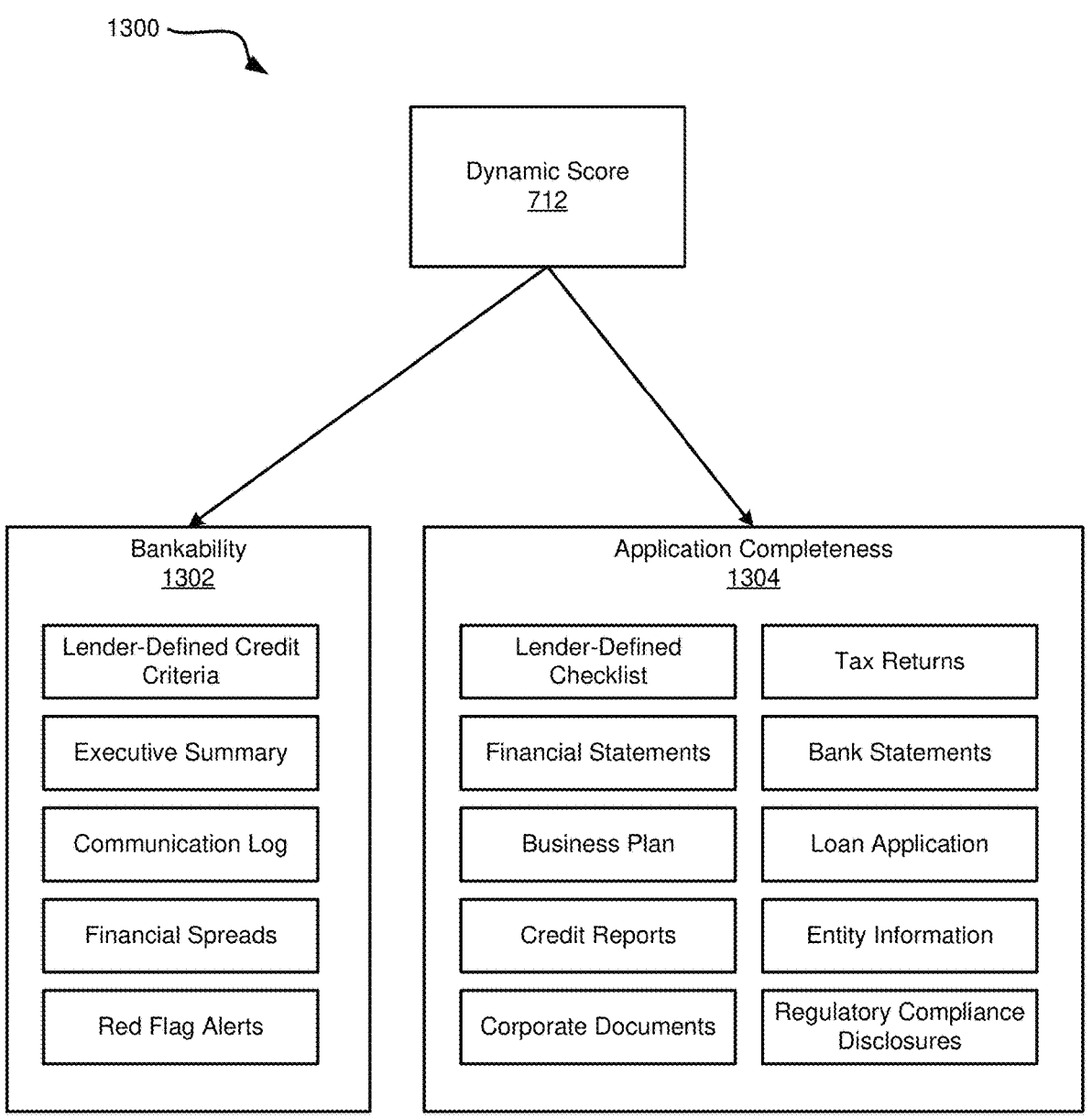
FIG. 13 is a schematic block diagram of a data flow for a dynamic score including a bankability score and an application completeness score.

FIG. 13 is a schematic diagram of a data flow 1300 for sub-components of the dynamic score 712. In some implementations and use-cases, the dynamic score 712 includes separate scores for bankability 1302 and data package completeness 1304.

The bankability 1302 score includes lender-defined credit criteria, an executive summary, a communication log, financial spreads, and red flag alerts. The data aggregation platform 106 renders the bankability 1302 score on a user interface that is accessible only to certain users within the platform. The user interface comprises permissions indicating that only certain users may read or manipulate the data presented in the bankability 1302 score.

The data package completeness 1304 score includes a lender-defined checklist, tax returns, financial statements, bank statements, business plans, loan applications, credit reports, entity information, corporate documents, regulatory compliance disclosures, and so forth. The application completeness 1304 score is rendered by the data aggregation platform 106 on a user interface that is only viewable by certain users associated with the data package.

FIG. 14 is a schematic block diagram of a system and method 1400 for identifying a storage location for a file. The method 1400 is executed by the data aggregation server 102 and the AI/ML engine 104.

The method 1400 begins with a data source 1402 providing a file to the data aggregation server 102, and further with the data aggregation server 102 ingesting the file at 1410. The method 1400 continues with the data aggregation server 102 identifying at 1412 an applicable aggregated data package 122. The data aggregation server 102 makes this determination based on an identity of the data source 1402 and/or whether the data source 1402 provided the file in response to a digital data request. The identity of the data source 1402 may be known based on an address associated with the data source 1402, such as the email address, IP address, phone number, or other address associated with providing the file. The identity of the data source 1402 may be known if the file is uploaded via the data aggregation platform 106 through a logged-in user account. In some cases, the file is provided to the data aggregation server 102 in response to a digital data request, which may include an email requesting a certain document, a message within the data aggregation platform 106 requesting a certain document, a unique URL for uploading documents, and so forth. The data aggregation server 102 selects an aggregated data package 122 stored on the database 114 that is associated with the digital data request and/or the identity of the data source 1402.

The method 1400 continues and the data aggregation server 102 stores the file on a data shoebox bucket 124 associated with the aggregated data package 122. The data shoebox bucket 124 is configured to store "unclassified" data, such as files and other data inputs that do not have sufficient metadata to determine the content of the data. The data shoebox bucket 124 is in itself a bucket 118 on the database 114. Each aggregated data package 122 may include a plurality of buckets 118, and each of the buckets 118 may be assigned to store a certain type of data. For example, one bucket 118 within the aggregated data package 122 may include the catch-all data shoebox bucket 124. Further for example, other buckets 118 associated with the aggregated data package 122 may be dedicated to storing different types of information, such as income and asset information, work history information, demographic information, and so forth.

The method 1400 continues and the data aggregation server 102 causes the AI/ML engine 104 to process the file at 1416 stored in the data shoebox bucket 124 to classify the file based on content of the file. The AI/ML engine 104 then "reads" the file and processes the file with a large language model (LLM) to determine a content of the file. By way of example, the AI/ML engine 104 may process a file and then output a classification indicating the file is a United States tax document from a certain tax year. The AI/ML engine 104 may further process the file to indicate names, addresses, asset values, and so forth, that are identified in the file.

The method 1400 continues and the data aggregation server 102 moves the file at 1418 from the data shoebox bucket 124 based on the classification output by the AI/ML engine 104. The data aggregation server 102 may identify a different bucket 118 associated with the aggregated data package 122 that is dedicated to storing information with the classification output by the AI/ML engine 104. For example, if the AI/ML engine 104 indicates the file is a tax document for a certain individual from a certain tax year, then the data aggregation server 102 may move the file from the data shoebox bucket 124 to a bucket 118 that is dedicated to storing information that includes tax documents.

FIG. 15 is a schematic flow chart diagram of a method 1500 for identifying a storage location for a file on a cloud-based database. The method 1500 may be performed by the data aggregation server 102.

The method 1500 includes ingesting at 1502 a file from a data source. The file may include a structured file or an unstructured file. The method 1500 includes identifying at 1504 an aggregated data package to receive the file based on one or more of an identity of the data source or whether the data source provided the file in response to a digital data request. The method 1500 includes storing at 1506 the file in a data shoebox associated with the aggregated data package, wherein the data shoebox receives unclassified data. The method 1500 includes causing at 1508 a neural network to classify the file based on content of the file. The method 1500 includes moving at 1510 the file from the data shoebox to an identified data bucket within the aggregated data package based on a file classification output by the neural network.

Figure 16:
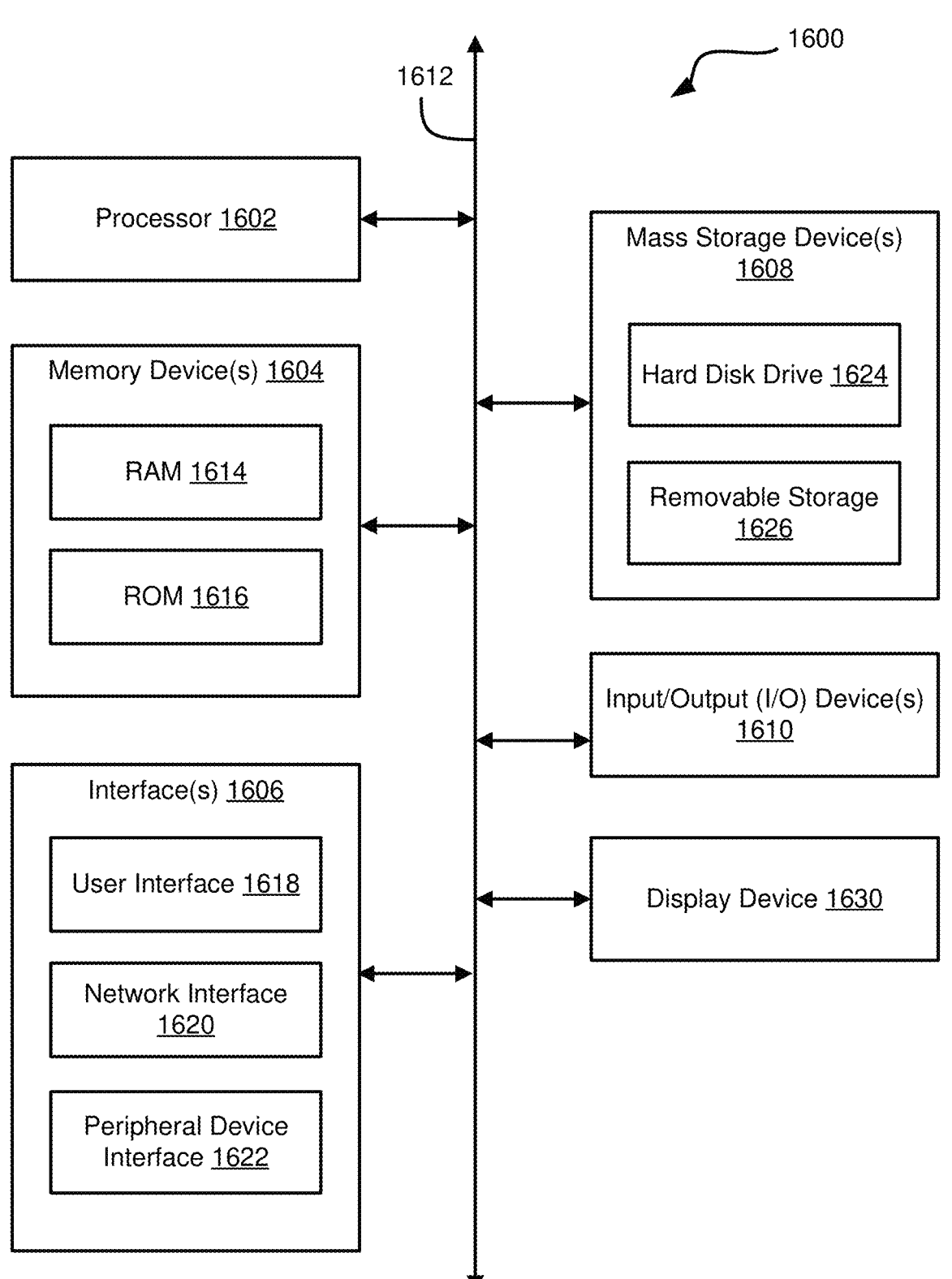
FIG. 16 is a schematic diagram illustrating components of an example computing device.

Referring now to FIG. 16, a block diagram of an example computing device 1600 is illustrated. Computing device 1600 may be used to perform various procedures, such as those discussed herein. Computing device 1600 can perform various monitoring functions as discussed herein, and can execute one or more application programs, such as the application programs or functionality described herein. Computing device 1600 can be any of a wide variety of computing devices, such as a desktop computer, in-dash computer, vehicle control system, a notebook computer, a server computer, a handheld computer, tablet computer and the like.

Computing device 1600 includes one or more processor(s) 1604, one or more memory device(s) 1604, one or more interface(s) 1606, one or more mass storage device(s) 1608, one or more Input/output (I/O) device(s) 1610, and a display device 1630 all of which are coupled to a bus 1612. Processor(s) 1604 include one or more processors or controllers that execute instructions stored in memory device(s) 1604 and/or mass storage device(s) 1608. Processor(s) 1604 may also include various types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device 1608 is a hard disk drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include cursor control devices, keyboards, keypads, microphones, monitors or other display devices, speakers, printers, network interface cards, modems, and the like.

Display device 1630 includes any type of device capable of displaying information to one or more users of computing device 1600. Examples of display device 1630 include a monitor, display terminal, video projection device, and the like.

Interface(s) 1606 include various interfaces that allow computing device 1600 to interact with other systems, devices, or computing environments. Example interface(s) 1606 may include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more user interface elements 1618. The interface(s) 1606 may also include one or more peripheral interfaces such as interfaces for printers, pointing devices (mice, track pad, or any suitable user interface now known to those of ordinary skill in the field, or later discovered), keyboards, and the like.

Bus 1612 allows processor(s) 1604, memory device(s) 1604, interface(s) 1606, mass storage device(s) 1608, and I/O device(s) 1610 to communicate with one another, as well as other devices or components coupled to bus 1612. Bus 1612 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1600 and are executed by processor(s) 1602. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes rendering a user interface for a data aggregation platform, wherein the user interface comprises a means for uploading a file or a data input over a network. The method includes ingesting the file or the data input provided by a user via the user interface. The method includes classifying the file or the data input based on a category selected on the user interface when the user provided the file or the data input.

Example 2 is a method as in Example 1, further comprising assigning permissions to the file or the data input based on an identify of the user.

Example 3 is a method as in any of Examples 1-2, further comprising verifying an identity of the user prior to enabling the user to select the category on the user interface.

Example 4 is a method as in any of Examples 1-3, wherein rendering the user interface for the data aggregation platform includes rendering a sidebar comprising a plurality of categories, and wherein the plurality of categories comprises a leads category for applications not yet initiated, an origination category for applications currently underway, a portfolio category for all applications, and an archive category for archived applications.

Example 5 is a method as in any of Examples 1-4, wherein rendering the user interface includes rendering an overview table comprising a plurality of rows and a plurality of columns, wherein each row comprises information for a single application.

Example 6 is a method as in any of Examples 1-5, wherein rendering the user interface includes enabling a user to pin at least one row of the plurality of rows to a certain order within the overview table.

Example 7 is a method as in any of Examples 1-6, wherein rendering the user interface includes enabling a user to adjust one or more of a position or a category of any of the plurality of columns.

Example 8 is a method as in any of Examples 1-7, wherein rendering the user interface comprises rendering an information column in the overview table, wherein the information column comprises a hover button, and wherein the user interface display and over lay box comprises information about an applicable application in response to the user hovering a cursor over the hover button.

Example 9 is a method as in any of Examples 1-8, wherein rendering the user interface comprises rendering an overview of an application, and wherein the overview comprises a means for adding, editing, or deleting an applicant associated with the application.

Example 10 is a method as in any of Examples 1-9, wherein rendering the user interface comprises rendering an overview of an application, and wherein the overview comprises a means for adding, editing, or deleting a collateral offering associated with the application.

Example 11 is a method as in any of Examples 1-10, wherein rendering the user interface comprises rendering an overview of an application, and wherein the overview comprises a means for adding, editing, or deleting an applicant team member associated with the application.

Example 12 is a method as in any of Examples 1-11, wherein rendering the user interface comprises rendering an overview of an application, and wherein the overview comprises a means for adding, editing, or deleting a lender team member associated with the application.

Example 13 is a method as in any of Examples 1-12, wherein rendering the user interface comprises rendering an overview of an application, and wherein the overview comprises a graphical representation of a numerical proportion of all requested data inputs for the application have been successfully provided to the data aggregation platform.

Example 14 is a method as in any of Examples 1-13, wherein rendering the user interface comprises rendering an overview of an application, and wherein the overview comprises a graphical representation of a numerical proportion of all requested data inputs for the application that have been accepted by an account manager for the application.

Example 15 is a method as in any of Examples 1-14, wherein rendering the user interface comprises rendering a listing of all data inputs for the application that have not yet been submitted by an applicant for the application.

Example 16 is a method as in any of Examples 1-15, wherein rendering the user interface comprises rendering a file upload module for an application, and wherein the file upload module comprises a plurality of buttons each associated with a unique file to be uploaded for the application.

Example 17 is a method as in any of Examples 1-16, further comprising, in response to a user uploading a first file for an application in response to selecting a first button within the file upload module, classifying the first file as belonging to a category for the first button.

Example 18 is a method as in any of Examples 1-17, wherein rendering the user interface comprises rendering a messaging portal that enables real-time messaging between an applicant and a team member associated with a single application on the data aggregation platform.

Example 19 is a method as in any of Examples 1-18, wherein rendering the user interface comprises rendering a table overview of one or more of all archived application associated with a single client account on the data aggregation platform, or all applications and existing loans associated with the single client account on the data aggregation platform.

Example 20 is a method as in any of Examples 1-19, wherein rendering the user interface comprises providing a means for a user to indicate which files or data inputs should be requested for a plurality of applicant types and a plurality of application types.

Example 21 is a method as in any of Examples 1-20, further comprising, in response to ingesting the file associated with the category, automatically renaming the file based on a customized naming convention for the category.

Example 22 is a method as in any of Examples 1-21, wherein rendering the user interface comprises providing a means for a user to input the customized naming convention for the category.

Example 23 is a method. The method includes ingesting a file from a data source. The method includes identifying an aggregated data package to receive the file based on one or more of an identity of the data source or whether the data source provided the file in response to a digital data request. The method includes storing the file in a data shoebox associated with the aggregated data package, wherein the data shoebox receives unclassified data. The method includes causing a neural network to classify the file based on content of the file. The method includes moving the file from the data shoebox to an identified data bucket within the aggregated data package based on a file classification output by the neural network.

Example 24 is a method as in Example 23, further comprising: generating an application based on information associated with the aggregated data package; and calculating a primary dynamic score for the application, wherein the primary dynamic score comprises a numerical recommendation indicating whether the application should be approved or denied.

Example 25 is a method as in any of Examples 23-24, wherein calculating the primary dynamic score comprises calculating based on a plurality of thresholds, and wherein the plurality of thresholds comprises one or more of: an asset value threshold for one or more applicants of the application; a work history threshold for the one or more applicants of the application; or a credit report threshold for the one or more applicants of the application.

Example 26 is a method as in any of Examples 23-25, further comprising calculating a personalized dynamic score for the application, wherein the personalized dynamic score comprises a personalized numerical recommendation indicating whether an identified decision maker should approve or deny the application; and wherein calculating the personalized dynamic score comprises calculating based on a plurality of thresholds defined by the identified decision maker.

Example 27 is a method as in any of Examples 23-26, wherein data associated with the aggregated data package is stored on a cloud-based database, and wherein data stored on the cloud-based database is partitioned across a plurality of data buckets.

Example 28 is a method as in any of Examples 23-27, wherein the cloud-based database comprises a plurality of data buckets associated with the aggregated data package.

Example 29 is a method as in any of Examples 23-28, wherein the data shoebox is one of the plurality of data buckets associated with the aggregated data package.

Example 30 is a method as in any of Examples 23-29, wherein the file comprises an unstructured file, and wherein the neural network is configured to execute an optical character recognition algorithm on the unstructured file to identify textual characters within the unstructured file.

Example 31 is a method as in any of Examples 23-30, wherein the neural network comprises a large language model such that the neural network processes the file to determine the content of the file.

Example 32 is a method as in any of Examples 23-31, wherein the identified data bucket is dedicated to storing data of a certain file-type.

Example 33 is a method as in any of Examples 23-32, wherein the identified data bucket is dedicated to storing data of a certain content-type.

Example 34 is a method as in any of Examples 23-33, further comprising generating metadata for the file based on the classification output by the neural network.

Example 35 is a method as in any of Examples 23-34, further comprising: extracting information from the aggregated data package; and translating the extracted information into a standardized application format to prepare a standardized application.

Example 36 is a method as in any of Examples 23-35, wherein the standardized application comprises a loan application compliant with a government agency.

Example 37 is a method as in any of Examples 23-36, wherein the file comprises an unstructured file that comprises an imager or a scan, and wherein the method further comprises: providing the unstructured file to a file analysis neural network trained to read the unstructured file and identify one or more words depicted in the unstructured file; receiving from the file analysis neural network an indication of the one or more words depicted in the unstructured file; generating one or more datapoints based on the one or more words depicted in the unstructured file; and assigning the one or more datapoints to one or more of a plurality of data buckets associated with the aggregated data package.

Example 38 is a method as in any of Examples 23-37, further comprising applying permissions to the file such that one or more accounts linked to the aggregated data package has read and/or write permissions to the file.

Example 39 is a method as in any of Examples 23-38, wherein the aggregated data package comprises information stored across a plurality of data buckets, and wherein one or more of the plurality of data buckets is a table within a relational database, and wherein the aggregated data package is stored on the relational database.

Example 40 is a method as in any of Examples 23-39, wherein the aggregated data package is associated with an application, and wherein a plurality of data buckets associated with the aggregated data package are organized with a parent-child data model comprising: a parent data level associated with the application itself; one or more first child data levels associated with the parent data level and configured to be associated with an applicant of the application; and a plurality of second child data levels, wherein each second child data level is associated with at least one of the one or more first child data levels; and wherein each of the plurality of second child data levels is configured to receive one or more of an unstructured file, a structured file, or a text data point associated with the corresponding applicant of the application.

Example 41 is a system comprising one or more processors configured to execute instructions stored in non-transitory computer readable storage medium, wherein the instructions comprise any of the method steps of any of Examples 1-40.

Example 42 is non-transitory computer readable storage medium storing instructions for execution by one or more processors, wherein the instructions comprise any of the method steps of any of Examples 1-40.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
ingesting a file from a data source;
identifying an aggregated data package to receive the file based on one or more of an identity of the data source or whether the data source provided the file in response to a digital data request;
   storing the file in a data shoebox associated with the aggregated data package, wherein the data shoebox receives unclassified data;
   causing a neural network to classify the file based on content of the file;
   moving the file from the data shoebox to an identified data bucket within the aggregated data package based on a file classification output by the neural network;
   generating an application based on information associated with the aggregated data package; and
   calculating a primary dynamic score for the application, wherein the primary dynamic score comprises an indication of at least one threshold.

2. The method of claim 1,
wherein the primary dynamic score comprises a numerical recommendation indicating whether the application should be approved or denied.

3. The method of claim 2, wherein calculating the primary dynamic score comprises calculating based on a plurality of thresholds, and wherein the plurality of thresholds comprises one or more of:
   an asset value threshold for one or more applicants of the application;
   a work history threshold for the one or more applicants of the application; or
   a credit report threshold for the one or more applicants of the application.

4. The method of claim 2, further comprising calculating a personalized dynamic score for the application, wherein the personalized dynamic score comprises a personalized numerical recommendation indicating whether an identified decision maker should approve or deny the application; and
   wherein calculating the personalized dynamic score comprises calculating based on a plurality of thresholds defined by the identified decision maker.

5. The method of claim 1, wherein data associated with the aggregated data package is stored on a cloud-based database, and wherein data stored on the cloud-based database is partitioned across a plurality of data buckets.

6. The method of claim 5, wherein the cloud-based database comprises a plurality of data buckets associated with the aggregated data package.

7. The method of claim 6, wherein the data shoebox is one of the plurality of data buckets associated with the aggregated data package.

8. The method of claim 1, wherein the file comprises an unstructured file, and wherein the neural network is configured to execute an optical character recognition algorithm on the unstructured file to identify textual characters within the unstructured file.

9. The method of claim 1, wherein the neural network comprises a large language model such that the neural network processes the file to determine the content of the file.

10. The method of claim 1, wherein the identified data bucket is dedicated to storing data of a certain file-type.

11. The method of claim 1, wherein the identified data bucket is dedicated to storing data of a certain content-type.

12. The method of claim 1, further comprising generating metadata for the file based on the classification output by the neural network.

13. The method of claim 1, further comprising:

extracting information from the aggregated data package; and translating the extracted information into a standardized application format to prepare a standardized application.

14. The method of claim 13, wherein the standardized application comprises a loan application compliant with a government agency.

15. The method of claim 1, wherein the file comprises an unstructured file that comprises an image or a scan, and wherein the method further comprises:

providing the unstructured file to a file analysis neural network trained to read the unstructured file and identify one or more words depicted in the unstructured file;

receiving from the file analysis neural network an indication of the one or more words depicted in the unstructured file;

generating one or more datapoints based on the one or more words depicted in the unstructured file; and assigning the one or more datapoints to one or more of a plurality of data buckets associated with the aggregated data package.

16. The method of claim 1, further comprising applying permissions to the file such that one or more accounts linked to the aggregated data package has read and/or write permissions to the file.

17. The method of claim 1, wherein the aggregated data package comprises information stored across a plurality of data buckets, and wherein one or more of the plurality of data buckets is a table within a relational database, and wherein the aggregated data package is stored on the relational database.

18. The method of claim 1, wherein the aggregated data package is associated with an application, and wherein a plurality of data buckets associated with the aggregated data package are organized with a parent-child data model comprising:

a parent data level associated with the application itself;

one or more first child data levels associated with the parent data level and configured to be associated with an applicant of the application; and a plurality of second child data levels, wherein each second child data level is associated with at least one of the one or more first child data levels; and wherein each of the plurality of second child data levels is configured to receive one or more of an unstructured file, a structured file, or a text data point associated with the corresponding applicant of the application.

19. Non-transitory computer readable storage medium storing instructions for execution by one or more processors, the instructions comprising:

ingesting a file from a data source;

identifying an aggregated data package to receive the file based on one or more of an identity of the data source or whether the data source provided the file in response to a digital data request;

storing the file in a data shoebox associated with the aggregated data package, wherein the data shoebox receives unclassified data;

causing a neural network to classify the file based on content of the file;

moving the file from the data shoebox to an identified data bucket within the aggregated data package based on a file classification output by the neural network;

generating an application based on information associated with the aggregated data package; and calculating a primary dynamic score for the application, wherein the primary dynamic score comprises an indication of at least one threshold.

20. A method comprising:

ingesting a file from a data source;

identifying an aggregated data package to receive the file based on one or more of an identity of the data source or whether the data source provided the file in response to a digital data request;

storing the file in a data shoebox associated with the aggregated data package, wherein the data shoebox receives unclassified data;

causing a neural network to classify the file based on content of the file;

moving the file from the data shoebox to an identified data bucket within the aggregated data package based on a file classification output by the neural network;

wherein the file comprises an unstructured file that comprises an image or a scan, and wherein the method further comprises:

providing the unstructured file to a file analysis neural network trained to read the unstructured file and identify one or more words depicted in the unstructured file;

receiving from the file analysis neural network an indication of the one or more words depicted in the unstructured file;

generating one or more datapoints based on the one or more words depicted in the unstructured file; and assigning the one or more datapoints to one or more of a plurality of data buckets associated with the aggregated data package.

* * * * *